US012293392B2

(12) United States Patent
Arora et al.

(10) Patent No.: US 12,293,392 B2
(45) Date of Patent: May 6, 2025

(54) INTELLIGENTLY MANAGING INVOICE PROCESSING USING BLOCKCHAIN AND MIXED REALITY APPLICATIONS

(71) Applicant: Bank of America Corporation, Charlotte, NC (US)

(72) Inventors: Anil Kumar Arora, Haryana (IN); Vijay Singh Shekhawat, Rajasthan (IN); Shahid Khan Gorewal, Faridabad (IN); Pankaj Kumar, Gurugram (IN); Sreekanth Raghuveer Maringanti, Hyderabad (IN); Vidhya Vaithiyanathan, Chennai (IN); Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 451 days.

(21) Appl. No.: 17/678,851

(22) Filed: Feb. 23, 2022

(65) Prior Publication Data

US 2023/0267518 A1 Aug. 24, 2023

(51) Int. Cl.
*G06Q 30/00* (2023.01)
*G06Q 30/04* (2012.01)

(52) U.S. Cl.
CPC .................................... *G06Q 30/04* (2013.01)

(58) Field of Classification Search
CPC ..................................................... G06Q 30/04
See application file for complete search history.

(56) References Cited

U.S. PATENT DOCUMENTS

2020/0005295 A1 1/2020 Murphy
2020/0034254 A1 1/2020 Natanzon
2020/0250177 A1 * 8/2020 Padmanabhan ....... G06F 16/214

FOREIGN PATENT DOCUMENTS

WO 2017098519 A1 6/2017

* cited by examiner

*Primary Examiner* — Rokib Masud
(74) *Attorney, Agent, or Firm* — Banner & Witcoff, Ltd.

(57) ABSTRACT

Aspects of the disclosure relate to intelligently managing invoice processing using blockchain and mixed reality applications. The computing platform may receive invoices and may analyze the invoices to determine a priority order in which the invoices should be processed. The computing platform may use an auto-matching algorithm to identify errors within the invoice and to generate proposed solutions to fix the errors. The computing platform may transmit the invoice to an enterprise organization for modifications and may receive, from the enterprise organization, confidential data including a modified invoice. The computing platform may receive, from an entity associated with a transaction indicated on the invoice, a request to access the modified invoice using a mixed reality application. The computing platform may receive, from the entity and based on the entity's review of the modified invoice using the mixed reality application, approval to execute the modified invoice.

20 Claims, 22 Drawing Sheets

INTELLIGENTLY MANAGING INVOICE PROCESSING USING BLOCKCHAIN AND MIXED REALITY APPLICATIONS

BACKGROUND

Aspects of the disclosure relate to hardware and software for intelligently managing invoice processing using blockchain and mixed reality applications. In particular, one or more aspects of the disclosure relate to prioritizing the order in which received invoices should be processed, maintaining the confidentiality of sensitive information within each received invoice, and using mixed reality applications to access the confidential data within each received invoice.

Current management protocols for processing invoices do not prioritize the received invoices based on a holistic review of each invoice and do not provide a security framework wherein the data within each invoice is kept confidential. Under current protocols, when an invoice is received by a financial institution, the financial institution may sort the invoices into separate processing queues based on the transaction indicated on each invoice. The financial institution may analyze each invoice in each queue to determine whether each invoice should be processed further. The financial institution may determine that the data entry fields on an invoice are incomplete and that the invoice should be removed from further processing. Alternatively, the financial institution may determine that the data entry fields are populated and that the invoice may proceed for further processing. However, the invoices may be processed in the order in which they were received as opposed to being processed in accordance with a priority framework. Consequently, the invoices that may require expedited execution (e.g., payment) or may be associated with high priority customers might not be processed in a timely manner.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with intelligently managing invoice processing using blockchain and mixed reality applications.

In accordance with one or more embodiments, a method may comprise, at a computing device configured to operate in a peer-to-peer (P2P) network including at least one or more processors and memory storing at least a portion of a blockchain of the P2P network, analyzing, using validation criteria, a plurality of invoices to determine a validity of each invoice of the plurality of invoices. The method may comprise determining, based on a broker associated with the invoice, a risk level associated with the broker. The method may comprise transmitting, based on the risk level associated with the broker, the invoice to a processing queue of a plurality of processing queues. The method may comprise identifying errors within the invoice and proposed solutions to fix the errors. The method may comprise transmitting, to an enterprise organization, the invoice, the errors, and the proposed solutions. The method may comprise receiving, from the enterprise organization, confidential data, wherein the confidential data comprises an invoice that was modified using at least one of the proposed solutions. The method may comprise receiving, from an entity associated with a transaction indicated on the invoice, a request to access the modified invoice, wherein the request comprises identification credentials associated with a mixed reality application that is used to access the modified invoice. The method may comprise determining, using the mixed reality application, whether the modified invoice satisfies approval criteria. The method may comprise based on the modified invoice satisfying the approval criteria, transmitting, to the enterprise organization, a notification authorizing execution of the modified invoice.

In accordance with one or more embodiments, a computing platform may comprise at least one processor, a communication interface communicatively coupled to the at least one processor, and memory storing at least a portion of a blockchain in a peer-to-peer (P2P) network and computer-readable instructions that, when executed by the at least one processor, cause the computing platform to analyze, using validation criteria, a plurality of invoices to determine a validity of each invoice of the plurality of invoices. The computing platform may determine, based on a broker associated with the invoice, a risk level associated with the broker. The computing platform may transmit, based on the risk level associated with the broker, the invoice to a processing queue of a plurality of processing queues. The computing platform may identify errors within the invoice and proposed solutions to fix the errors. The computing platform may transmit, to an enterprise organization, the invoice, the errors, and the proposed solutions. The computing platform may receive, from the enterprise organization, confidential data, wherein the confidential data comprises an invoice that was modified using at least one of the proposed solutions. The computing platform may receive, from an entity associated with a transaction indicated on the invoice, a request to access the modified invoice, wherein the request comprises identification credentials associated with a mixed reality application that is used to access the modified invoice. The computing platform may determine, using the mixed reality application, whether the modified invoice satisfies approval criteria. The computing platform may, based on the modified invoice satisfying the approval criteria, transmit, to the enterprise organization, a notification authorizing execution of the modified invoice.

In accordance with one or more embodiments, one or more non-transitory computer-readable media storing instructions that, when executed by a computing platform comprising at least one processor, memory storing at least a portion of a blockchain in a peer-to-peer (P2P) network, and a communication interface, cause the computing platform to analyze, using validation criteria, a plurality of invoices to determine a validity of each invoice of the plurality of invoices. The instructions, when executed, may cause the computing platform to determine, based on a broker associated with the invoice, a risk level associated with the broker. The instructions, when executed, may cause the computing platform to transmit, based on the risk level associated with the broker, the invoice to a processing queue of a plurality of processing queues. The instructions, when executed, may cause the computing platform to identify errors within the invoice and proposed solutions to fix the errors. The instructions, when executed, may cause the computing platform to transmit, to an enterprise organization, the invoice, the errors, and the proposed solutions. The instructions, when executed, may cause the computing platform to receive, from the enterprise organization, confidential data, wherein the confidential data comprises an invoice that was modified using at least one of the proposed solutions. The instructions, when executed, may cause the computing platform to receive, from an entity associated with a transaction indicated on the invoice, a request to access the modified invoice, wherein the request comprises identification credentials associated with a mixed reality application that is used to access the modified invoice. The instructions, when executed, may cause the computing platform to determine, using the mixed reality application, whether the modified invoice satisfies approval criteria. The instructions, when executed, may cause the computing platform to, based on the modified invoice satisfying the approval criteria, transmit, to the enterprise organization, a notification authorizing execution of the modified invoice.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
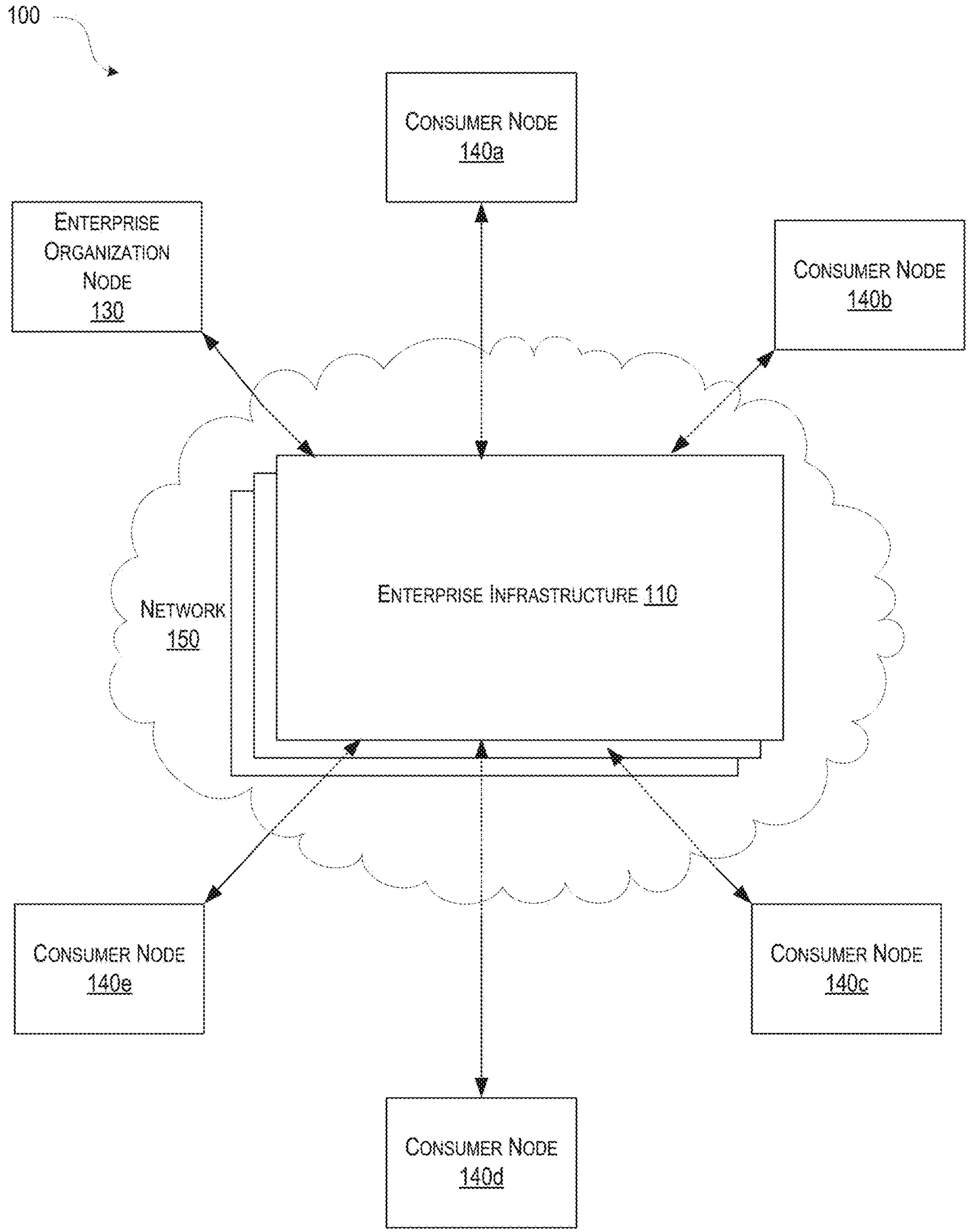
FIG. 1A depicts an illustrative example of a computer system for intelligently managing invoice processing using blockchain and mixed reality applications, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current management protocols for processing invoices do not prioritize the received invoices based on a holistic review of each invoice and do not provide a security framework wherein the data within each invoice is kept confidential. Accordingly, proposed herein is a solution to the problem described above that includes intelligently managing invoice processing using blockchain and mixed reality applications. For example, invoices may be stored and distributed within a blockchain network. The blockchain network may contain an enterprise organization node, a consumer node, an analysis node, a prioritization module, a root cause analysis module, an assignment node, a processing node, and an approval node. The analysis node may extract data from an invoice and may use the extracted data to determine the validity of the invoice. The prioritization node may train and use a machine learning model to generate data that describes at least one of a transaction indicated on the invoice or a risk level of a broker associated with the invoice. The prioritization node may transmit the invoice to a processing queue of a plurality of processing queues. The root cause analysis node may retrieve the invoice from the processing queue and may identify errors within the invoice. The root cause analysis node may generate a proposed solution for each identified error. The assignment node may use the identified errors and proposed solutions to identify an available agent within an enterprise organization that has the skill level to process the invoice. The assignment node may transmit the invoice, the identified errors, and the proposed solutions to the identified agent. The processing node may receive, from the identified agent, confidential data which comprises a processed invoice, wherein the invoice was modified using at least one of the proposed solutions. The approval node may analyze the processed invoice to determine whether the enterprise organization may finalize the processed invoice.

In some examples, a computing device may be configured to operate in a peer-to-peer (P2P) blockchain network. The logic and output of each node within the P2P blockchain network, described herein, may be used to train a machine learning model, wherein the machine learn model may study the function of each node and may replicate the function of each node on a larger scale. Configuring the P2P blockchain network may include receiving and storing, by the enterprise organization node, an invoice from a broker. The enterprise organization node may transmit the invoice to the analysis node. The analysis node may extract data from the invoice and may use the extracted data to determine the validity of the invoice. The analysis node may determine that the invoice is valid and may transmit the invoice to the prioritization module. A sorting node of the prioritization module may train and use a machine learning model to generate data that describes at least one of a transaction indicated on the invoice and a risk level of the broker that generated the invoice. The sorting node may use one of the transaction indicated on the invoice or the risk level of the broker to identify a processing queue, of a plurality of current processing queues, which corresponds to the invoice. If the processing queues within the plurality of current processing queues do not correspond to the invoice, the sorting node may generate a new processing queue that corresponds to the invoice, and may transmit an instruction to a verification node to analyze the new processing queue. The verification node may verify whether the current processing queues correspond to the invoice and, if the current processing queues do not correspond to the invoice, may verify the new processing queue. The sorting node may transmit the invoice to the processing queue.

The root cause analysis node may retrieve the invoice from the processing queue. An auto match node of the root cause analysis node may analyze the invoice using enterprise criteria to determine whether to revise the invoice. The auto match node may identify errors within the invoice and may generate proposed solutions to fix the errors. The root cause analysis node may transmit the invoice, the identified errors, and the proposed solutions to the assignment node. The assignment node may use the identified errors and proposed solutions to determine a level of skill that may be used to process the invoice. The assignment node may identify an available agent within the enterprise organization that has the determined skill level to process the invoice. The assignment node may transmit the invoice, the identified errors, and the proposed solutions to the identified agent.

The processing node may receive confidential data from the entity, wherein the confidential data may comprise an invoice that was modified using at least one of the proposed solutions. The processing node may determine whether the processed invoice satisfies the enterprise criteria, wherein the enterprise criteria contains guidelines for determining whether the invoice should be finalized for execution (e.g., payment). If the processing node determines that the processed invoice does not satisfy the enterprise criteria, the processing node may transmit the processed invoice to the broker. The processing node may instruct the broker to remedy the remaining errors within the processed invoice and may receive a revised invoice from the broker. The processing node may use the enterprise criteria to determine whether the revised invoice should be finalized for payment. Alternatively, if the processing node determines that the modified invoice satisfies the enterprise criteria, the processing node may transmit, to the approval node, an invitation to review the modified invoice.

The approval node may transmit, to the processing node, identification credentials to access the modified invoice, wherein the identification credentials may be associated with a mixed reality application that the approval node may use to view and edit the modified invoice. The processing node may determine whether the received identification credentials are authorized to access the confidential data using verification criteria. If the processing node determines that the received identification credentials are not authorized to access the confidential data, then the processing node may deny the approval node access to the confidential data. Alternatively, if the processing node determines that the received identification credentials are authorized to access the confidential data, then the processing node may grant the approval node access to the confidential data. The approval node may determine whether the processed invoice satisfies approval criteria. If the processed invoice satisfies the approval criteria, then the approval node may transmit a notification to the enterprise organization indicating that the enterprise organization should execute (e.g., settle, proceed to payment of, or the like) the processed invoice. If the modified invoice does not satisfy the approval criteria, then the approval node may edit the processed invoice in real-time, or near real-time. The approval node may transmit a notification to the enterprise organization indicating that the enterprise organization should process the modified invoice in accordance with the additional edits.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A consumer (e.g., a broker) may access the decentralized P2P system through a specialized "wallet" (i.e., Identity Wallet) that may uniquely identify the consumer and enable the consumer to perform functions related to the decentralized P2P network. Through the wallet, the consumer may be able to submit invoices to an enterprise organization, or any other function associated with the decentralized P2P system. Furthermore, the consumer may use the wallet to request performance of network-specific functions related to the decentralized P2P system such as invoice submission, invoice processing, or the like. The various computing devices forming the decentralized P2P computing system may operate as a team to perform network-specific functions requested by the consumer. In performing the network-specific functions, the various computing devices may produce blocks that store the data generated during the performance of the network-specific functions and may add the blocks to the blockchain. After the block has been added to the blockchain, the wallet associated with the consumer may indicate that the requested network-specific function has been performed.

For example, a consumer's wallet may contain identification documentation associated with the consumer. The consumer may use the identification documentation in the wallet to submit, to an enterprise organization, a request to process an invoice. The consumer may submit the request to process the invoice to the decentralized P2P system. The various computing devices forming the decentralized P2P computing system may extract the identification documentation from the wallet and may process the consumer request. In doing so, a block may be created by the various computing devices of the decentralized P2P computing system. The block may store data indicating that the request to process the invoice was submitted to the enterprise organization. The various computing devices may add the block to the blockchain. The wallet associated with the consumer may reflect the submission of the request to process the invoice.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as consumer-initiated invoice processing requests, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, invoice processing, fund transfers, cryptocurrency, digital content storage and delivery, entity authentication and authorization, digital identity, marketplace creation and operation, internet of things (IoT), prediction platforms, currency exchange and remittance, P2P transfers, ride sharing, and precious metal and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., consumer-initiated invoice processing requests, or the like) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions, requested by lightweight nodes, to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network. Examples of network functions may include "invoice submission requests" and/or "invoice processing requests."

Computer Architecture

FIG. 1A depicts an illustrative example of a computer system 100 that may be used for intelligently managing invoice processing in real-time, or near real-time, using blockchain and mixed reality applications in accordance with one or more aspects described herein. Centralized computer system 100 may comprise one or more computing devices including at least enterprise infrastructure 110, enterprise organization node 130, and consumer nodes 140*a*-140*e*. While FIG. 1A depicts more than one consumer node (e.g. consumer nodes 140*a*-140*e*), each of consumer nodes 140*a*-140*e* may be configured in accordance with the features described herein. While the description herein may make reference to consumer node 140, it is important to note that the functions described in connection with consumer node 140 may also be performed by any one of consumer nodes 140*a*-140*e*. Each one of consumer nodes 140*a*-140*e* and enterprise organization node 130 may be configured to communicate with enterprise infrastructure 110 through network 150. In some arrangements, centralized computer system 100 may include additional computing devices and networks that are not depicted in FIG. 1A, which may also be configured to interact with enterprise infrastructure 110 and, in some instances, consumer node 140.

Enterprise infrastructure 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Enterprise infrastructure 110 may include computing hardware and software that may host various data and applications for performing tasks of the centralized entity and interacting with consumer node 140, as well as other computing devices. As discussed in greater detail below in connection with FIG. 1B, enterprise infrastructure 110 may use analysis node 111, prioritization module 112, root cause analysis module 115, assignment node 118, processing node 119, approval node 120, invoice data database 121, historic invoices database 122, root cause database 123, availability and skills database 124, confidential data database 125, and machine learning model 128 to analyze received invoices. Each computing device within enterprise infrastructure 110 may contain processor(s) 127 and database 126, which may be stored in memory of the one or more computing devices of enterprise infrastructure 110. Through execution of computer-readable instructions stored in memory, the computing devices of enterprise infrastructure 110 may be configured to perform functions of the centralized entity and store the data generated during the performance of such functions in database 126.

In some arrangements, enterprise infrastructure 110 may include and/or be part of enterprise information technology infrastructure and may host a plurality of enterprise applications, enterprise databases, and/or other enterprise resources. Such applications may be executed on one or more computing devices included in enterprise infrastructure 110 using distributed computing technology and/or the like. In some instances, enterprise infrastructure 110 may include a relatively large number of servers that may support operations of the enterprise organization, such as a financial institution. Enterprise infrastructure 110, in this embodiment, may generate a single centralized ledger for data received from consumer node 140, which may be stored in database 126.

Consumer node 140 may be configured to interact with enterprise infrastructure 110 through network 150. In some instances, consumer node 140 may be configured to receive and transmit information corresponding to system requests through particular channels and/or representations of webpages and/or applications associated with enterprise infrastructure 110. The system requests provided by consumer node 140 may initiate the performance of particular computational functions, such as invoice processing, at enterprise infrastructure 110. In such instances, consumer node 140 may be an internal computing device associated with the particular entity corresponding to enterprise infrastructure 110 and/or may be an external computing device which is not associated with the particular entity.

As stated above, computer system 100 also may include one or more networks, which may interconnect one or more of enterprise infrastructure 110, consumer node 140, and enterprise organization node 130. For example, centralized computer system 100 may include network 150. Network 150 may include one or more sub-networks (e.g., local area networks (LANs), wide area networks (WANs), or the like). Furthermore, computer system 100 may include a local network configured to interconnect each of the computing devices comprising enterprise infrastructure 110.

Enterprise organization node 130 may receive an invoice from consumer node 140.

Enterprise organization node 130 may store the invoice in invoice data database 121. Enterprise organization node may transmit the invoice to analysis node 111 for further processing. Enterprise organization node 130 may receive, from prediction node 116 of root cause analysis module 115, a prediction indicating an amount of time that may be needed to process the invoice (e.g., whether the invoice may be processed without revisions from the broker, whether further information may be needed from the broker, a predicted amount of time to receive further revisions from the broker, an amount of time that a broker previously took to further revise invoices that were previously processed, or the like). Enterprise organization node 130 may receive, from processing node 119, a notification indicating that the processed invoice may proceed to execution (e.g., payment).

Enterprise organization node 130 may generate a plurality of criteria that may be used by a plurality of nodes within enterprise infrastructure 110 to prioritize and process invoices. Enterprise organization node 130 may generate validation criteria and may transmit the validation criteria to analysis node 111. The validation criteria may set forth requirements that analysis node 111 may use to determine whether the invoice should be processed further (e.g., whether the invoice contains data entry fields, whether the invoice contains data entry fields that require a response, whether the required data entry fields are populated, whether the responses within the populated data entry fields conform to an expected format, whether the invoice matches a previously received invoice stored in historic invoices database 122, or the like). Enterprise organization node 130 may generate consumer data and may transmit the consumer data to sorting node 113. The consumer data may describe consumer node 140 (e.g., the broker) that submitted the invoice to the enterprise organization node 130 (e.g., the broker's location, a number of invoices previously submitted by the broker, a number of approved invoices associated with the broker, a number of rejected invoices associated with the broker, monetary values associated with the invoices that were previously submitted by the broker, or the like).

Enterprise organization node 130 may generate enterprise criteria and may transmit the enterprise criteria to automatch node 117 of root cause analysis module 115. The enterprise criteria may contain instructions for determining whether the invoice satisfies requirements set forth by the enterprise organization (e.g., whether the transaction indicated on the invoice is recorded within a transaction history associated with an entity that is associated with the invoice, whether the transaction indicated on the invoice is indicated within an entity account history, whether a balance indicated on the invoice matches an amount within an entity account, or the like). Enterprise organization node 130 may generate invoice execution criteria and may transmit the invoice execution criteria to processing node 119. The invoice execution criteria may comprise instructions for determining whether the invoice may proceed to execution (e.g., payment).

Consumer node 140 may generate an invoice and may transmit the invoice to enterprise organization node 130. Consumer node 140 may be associated with a financial institution (e.g., a broker). Consumer node 140 may receive, from processing node 119, a request to further revise the information on the invoice (e.g., the monetary amount associated with the transaction indicated on the invoice, the denomination associated with the monetary amount indicated on the invoice, the entities associated with the transaction indicated on the invoice, or the like). Consumer node 140 may review the invoice and may revise the invoice such that the information indicated on the invoice is accurate (e.g., the monetary amount indicated on the invoice reflects the correct amount to be deducted from a consumer account, the entity associated with the transaction matches the entity associated with the entity account, or the like). Consumer node 140 may transmit further revisions to the invoice to processing node 119.

Figure 1B:
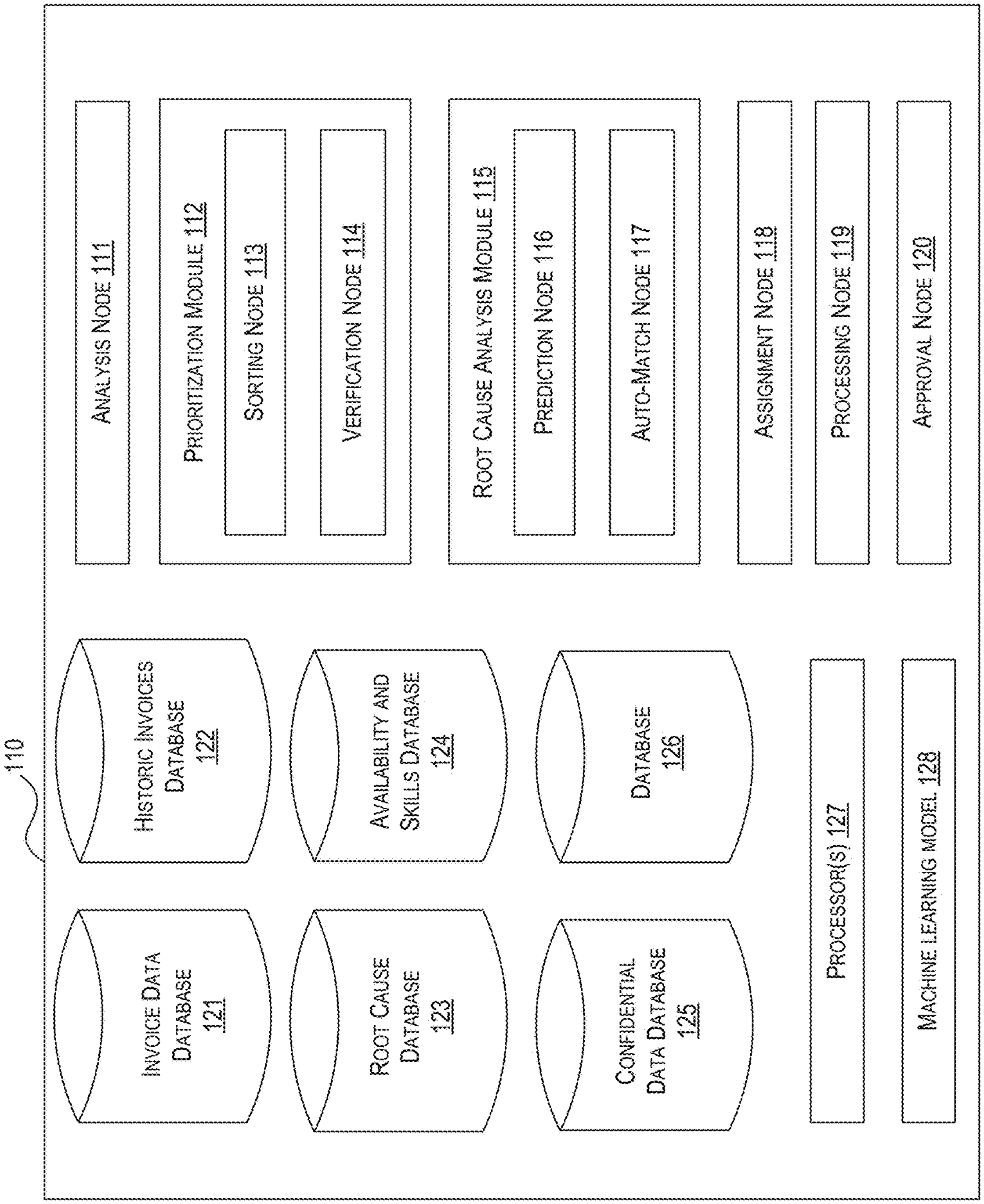
FIG. 1B depicts an illustrative example of the enterprise infrastructure that may be used for intelligently managing invoice processing using blockchain and mixed reality applications, in accordance with one or more example embodiments.

FIG. 1B depicts the components of enterprise infrastructure 110 that may be used for intelligently managing invoice processing in real-time, or near real-time, using blockchain and mixed reality applications in accordance with one or more aspects described herein. As discussed in connection with FIG. 1A, enterprise infrastructure 110 may contain analysis node 111, prioritization module 112, root cause analysis module 115, assignment node 118, processing node 119, approval node 120, invoice data database 121, historic invoices database 122, root cause database 123, availability and skills database 124, confidential data database 125, database 126, processor(s) 127, and machine learning model 128.

Analysis node 111 may train machine learning model 128 to analyze an invoice, extract data from the invoice, and use the extracted data to determine whether the invoice should be transmitted for further processing. The logic and output of analysis node 111, discussed below, may be used as training data for machine learning model 128. As such, over time, machine learning model 128 may independently perform the functions of analysis node 111. Analysis node 111 may receive, from enterprise organization node 130, an invoice generated by consumer node 140. Analysis node 111 may extract data from the received invoice (e.g., a number of data entry fields that are populated, a number of data entry fields that are not populated, whether the received invoice is blank, or the like). Analysis node 111 may store the extracted data in invoice data database 121. Access to invoice data database 121 may differ depending on the node that is requesting access (e.g., a hierarchy of accessibility). Enterprise organization node 130, analysis node 111, and sorting node 113 may be associated with a first level of accessibility (e.g., a least restrictive level of accessibility). Enterprise organization node 130, analysis node 111, and sorting node 113 may perform functions on the data stored within invoice data database 121 (e.g., access the invoices and extracted data, add invoices, add extracted data, add a risk level associated with a broker, remove invoices, remove extracted data, remove a risk level, modify invoices, modify extracted data, modify a risk level, or the like). Root cause analysis module 115 may be associated with a second level of accessibility (e.g., a more restrictive level of accessibility than the first level of accessibility). Root cause analysis module 115 may access the invoices, extracted data, and risk levels, but might not be permitted to add, remove, or modify the invoices, extracted data, or risk levels within invoice data database 121.

Analysis node 111 may continuously receive validation criteria from enterprise organization node 130. The validation criteria may set forth requirements that analysis node 111 may use to determine whether the invoice should be processed further (e.g., whether the invoice contains data entry fields, whether the invoice contains data entry fields that require a response, whether the required data entry fields are populated, whether the responses within the populated data entry fields conform to an expected format, whether the invoice matches a previously received invoice stored in historic invoices database 122, or the like). Analysis node 111 may analyze the extracted data using the validation criteria (e.g., compare the extracted data to the requirements set forth in the validation criteria) to determine whether the invoice should undergo further processing. If the extracted data fails to satisfy the validation criteria, then analysis node 111 may remove the invoice from further processing. Alternatively, if the extracted data satisfies the validation criteria, then analysis node 111 may transmit the invoice and the extracted data to prioritization module 112. Machine learning model 128 may store the logic executed by analysis node 111 as training data and may use the training data to study the function of analysis node 111. As such, machine learning model 128 may be able to replicate the function of auto-match node 117 on a larger scale (e.g., intelligently and efficiently analyzing an invoice, extracting data from the invoice, and using the extracted data to determine whether the invoice should be transmitted for further processing, or the like).

Prioritization module 112 may comprise sorting node 113 and verification node 114. Prioritization module 112 may use sorting node 113 and verification node 114 to train machine learning model 128 to determine whether a plurality of current processing queues contains the necessary processing queues into which received invoices may be sorted and to determine when to add a new processing queue to the plurality of current processing queues. The logic and output of sorting node 113 (e.g., an indication of whether the invoice may be sorted into a processing queue of the plurality of current processing queues) and the logic and output of verification node 114 (e.g., an indication of whether a new processing queue should be added to the plurality of current processing queues) may be used as training data for machine learning model 128, as discussed below. As such, over time, machine learning model 128 may independently perform the functions of sorting node 113 and verification node 114.

Sorting node 113 may continuously receive, from enterprise organization node 130, consumer data. The consumer data may describe the consumer (e.g., the broker) that submitted the invoice to the enterprise organization node 130 (e.g., the broker's location, a number of invoices previously submitted by the broker, a number of approved invoices associated with the broker, a number of rejected invoices associated with the broker, monetary values associated with the invoices that were previously submitted by the broker, or the like). Sorting node 113 may use the consumer data to determine a risk level that describes the broker. To determine a broker risk level, sorting node 113 may generate a hierarchy of factors (e.g., a total number of invoices transmitted by the broker and to the enterprise organization, a number of approved invoices associated with the broker, a number of rejected invoices associated with the broker, or the like) and may assign a weight to each factor within the hierarchy. Sorting node 113 may determine a weighted average of the factors, wherein the weighted average may be the risk level associated with broker. Sorting node 113 may store the determined risk level in invoice data database 121. Sorting node 113 may analyze the invoice and extracted data, received from analysis node 111, to determine a transaction indicated on the invoice and the entities associated with the invoice (e.g., the entity that provided the service or product indicated on the invoice and the entity that is responsible for payment of the service or product). Sorting node 113 may prioritize the invoice based on the risk level associated with the broker, the transaction indicated on the invoice, and the entities associated with the invoice. Sorting node 113 may transmit the invoice to a processing queue, of a plurality of current processing queues, based on the prioritization. To transmit the invoice to the processing queue, sorting node 113 may determine whether the invoice corresponds to a current processing queue of the plurality of current processing queues (e.g., whether the transaction indicated on the processing queue is of a type similar to transactions within a processing queue, whether the risk level of the broker associated with the invoice is the same risk level associated with the brokers that are associated with the invoices in a processing queue, or the like). If sorting node 113 determines that the invoice matches a current processing queue, then sorting node 113 may transmit the invoice to the processing queue. Alternatively, if sorting node 113 determines that the invoice does not match a current processing queue, then sorting node 113 may generate a new processing queue. If sorting node 113 generates a new processing queue, then sorting node 113 may transmit instructions to verification node 114 to analyze the new processing queue. Machine learning model 128 may store the logic executed by sorting node 113 as training data and may use the training data to study the function of sorting node 113. As such, machine learning model 128 may be able to replicate the function of sorting node 113 on a larger scale (e.g., intelligently and efficiently analyze a plurality of invoices, determine whether each invoice within the plurality of invoices may be sorted into a processing queue of the plurality of current processing queues, determine whether a new processing queue should be added to the plurality of current processing queues, or the like).

Verification node 114 may receive, from sorting node 113, instructions to analyze the new processing queue generated by sorting node 113. Verification node 114 may retrieve the invoice within the new processing queue. Verification node 114 may identify the transaction associated with the invoice, the risk level associated with the broker, and the priority level associated with the entities associated with the invoice. Verification node 114 may determine whether the type of transaction indicated on the invoice corresponds to the transactions associated with current processing queues. Verification node 114 may determine whether the risk level of the broker corresponds to the risk level of the brokers associated with the invoices in the current processing queues. Additionally, verification node 114 may determine whether the priority level of the entities associated with the invoice corresponds to the priority level associated with the entities associated with the invoices in current processing queues. If verification node 114 determines that the invoice within the new processing queue is substantially similar (e.g., the priority levels of the entities associated with the invoice match the priority levels of the entities associated with the invoices within the current processing queues, the risk level of the broker associated with the invoice matches the risk levels of the brokers associated with the invoices within the current processing queues, the nature of the transaction indicated on the invoice matches the nature of the transactions indicated on the invoices within the current processing queues, or the like) to the invoices within a current processing queue, then verification node 114 may instruct sorting node 113 to remove the invoice from the new processing queue and to transmit the invoice to a current processing queue. Alternatively, if verification node 114 determines that the invoice within the new processing queue is not substantially similar (e.g., the priority levels of the entities associated with the invoice are different from the priority levels of the entities associated with the invoices within the current processing queues, the risk level of the broker associated with the invoice is different from the risk levels of the brokers associated with the invoices within the current processing queues, the nature of the transaction indicated on the invoice is different from the nature of the transactions indicated on the invoices within the current processing queues, or the like) to the invoices within a current processing queue, then verification node 114 may add the new processing queue to the plurality of current processing queues. Machine learning model 128 may store the logic executed by verification node 114 as training data and may use the training data to study the function of verification node 114. As such, machine learning model 128 may be able to replicate the function of verification node 114 on a larger scale (e.g., intelligently and efficiently analyze the plurality of current processing queues, determine whether a plurality of invoices may be sorted in processing queues within the plurality of current processing queues, verify new processing queues, or the like).

Root cause analysis module 115 may access the invoice from a processing queue of the plurality of current processing queues. Prediction node 116 of root cause analysis module 115 may access the data stored within invoice data database 121 (e.g., the data extracted from the invoice, the risk level associated with the broker that is associated with the invoice, or the like). Prediction node 116 may use the data within invoice data database 121 to predict an amount of time that may be needed to process the invoice (e.g., whether the invoice may be processed without revisions from the broker, whether further information may be needed from the broker, whether the data entry fields within the invoice are fully populated, or the like). Prediction node 116 may transmit the prediction to enterprise organization node 130.

Root cause analysis module 115 may use auto-match node 117 to train machine learning model 128 to identify errors within the invoice and to generate potential solutions to each identified error. The logic and output of auto-match node 117 (e.g., a root cause analysis report) may be used as training data for machine learning model 128, as discussed below. As such, over time, machine learning model 128 may independently perform the functions of auto-match node 117. Auto-match node 117 may access the data within invoice data database 121. Auto-match node 117 may continuously receive enterprise criteria from enterprise organization node 130. The enterprise criteria may contain instructions for determining whether the invoice satisfies requirements set forth by the enterprise organization (e.g., whether the transaction indicated on the invoice is recorded within a transaction history associated with an entity that is associated with the invoice, whether the transaction indicated on the invoice is indicated within an entity account history, whether a balance indicated on the invoice matches an amount within an entity account, or the like). Auto-match node 117 may use the enterprise criteria to determine whether further action may be needed from enterprise organization node 130 to prepare the invoice for further processing.

Auto-match node 117 may use the enterprise criteria to generate a list of root cause errors associated with the invoice, wherein the root cause errors may indicate aspects of the invoice that do not satisfy the enterprise criteria. Auto-match node 117 may generate a list of proposed solutions to remedy each root cause error. To do so, auto-match node 117 may determine whether similar root cause errors were previously identified and whether solutions to the root cause errors were previously identified. Machine learning model 128 may store the logic executed by auto-match node 117 as training data and may use the training data to study the function of auto-match node 117. As such, machine learning model 128 may be able to replicate the function of auto-match node 117 on a larger scale (e.g., intelligently and efficiently analyze the enterprise criteria, identify errors within the invoice, generate proposed solutions to each identified error, or the like).

Auto-match node 117 may store the identified root cause errors and the possible solutions to remedy the root cause errors within root cause database 123. Access to root cause database 123 may differ depending on the node that is requesting access (e.g., a hierarchy of accessibility). Auto-match node 117 may be associated with a first level of accessibility (e.g., a least restrictive level of accessibility). Auto-match node 117 may perform functions on the data stored within root cause database 123 (e.g., access the root cause errors and proposed solutions, add root cause errors and proposed solutions, remove root cause errors and proposed solutions, modify root cause errors and proposed solutions, or the like). Assignment node 118 may be associated with a second level of accessibility (e.g., a more restrictive level of accessibility than the first level of accessibility). Assignment node 118 may access the root cause errors and proposed solutions, but might not be permitted to add, remove, or modify the root cause errors and proposed solutions within root cause database 123.

Assignment node 118 may train machine learning model 128 to determine the skill level that may be needed to handle execution of the invoice and to identify an agent within the enterprise organization with the necessary skill level and availability to handle the invoice. The logic and output of assignment node 118, discussed below, may be used as training data for machine learning model 128. As such, over time, machine learning model 128 may independently perform the functions of assignment node 118. Assignment node 118 may retrieve the root cause errors and proposed solutions from root cause database 123 and may retrieve the invoice from the processing queue. Assignment node 118 may use the invoice and the data within root cause database to determine a skill level that may be needed to process the invoice (e.g., whether the invoice can be processed by a junior agent, whether the invoice should be processed by a senior agent, particular agent skills needed to process the invoice, or the like). Assignment node 118 may store the determined skill level in availability and skills database 124. Assignment node 118 may retrieve, from availability and skills database 124, data indicating the availability of agents within the enterprise organization and the skill level of agents within the enterprise organization. Access to availability and skills database 124 may differ depending on the node that is requesting access (e.g., a hierarchy of accessibility). Enterprise organization node 130 may be associated with a first level of accessibility (e.g., a least restrictive level of accessibility). Enterprise organization node 130 may perform functions on the data stored within availability and skills database 124 (e.g., access the skills and availability data associated with an enterprise organization agent, remove the skills and availability data associated with an enterprise organization agent, modify the skills and availability data associated with an enterprise organization agent, or the like). Assignment node 118 may be associated with a second level of accessibility (e.g., a more restrictive level of accessibility than the first level of accessibility). Assignment node 118 may access the skills and availability data associated with an enterprise organization agent, but might not be permitted to add, remove, or modify the skills or the availability data associated with an enterprise organization agent within availability and skills database 124.

Assignment node 118 may compare the determined skill level to the skill level of agents within the enterprise organization. Assignment node 118 may identify at least one agent within the enterprise organization whose skill level may be sufficient to process the invoice. Assignment node 118 may consider the availability of the identified agents to determine whether at least one agent is available to process the invoice. Assignment node 118 may transmit the invoice to the identified agent with availability to process the invoice. Machine learning model may store the logic executed by assignment node 118 as training data and may use the training data to study the function of assignment node 118. As such, machine learning model 128 may be able to replicate the function of assignment node 118 on a larger scale (e.g., intelligently and efficiently determine the skill level that may be needed to handle execution of the invoice, identify an agent within the enterprise organization with the necessary skill level and availability to handle the invoice, or the like).

Processing node 119 may train machine learning model 128 to determine whether the invoice should be transmitted to the enterprise organization for execution. The logic and output of processing node 119, discussed below, may be used as training data for machine learning model 128. As such, over time, machine learning model 128 may independently perform the functions of processing node 119. Processing node 119 may receive, from the agent within the enterprise organization, confidential data associated with the processed invoice. The confidential data may comprise a root cause analysis associated with the processed invoice, wherein the root cause analysis may comprise suggested solutions, determined by the agent within the enterprise organization, to remedy the identified root cause errors within the invoice. Processing node 119 may store the confidential data in confidential data database 125. Access to confidential data database 125 may differ depending on the node that is requesting access (e.g., a hierarchy of accessibility). Processing node 119 may be associated with a first level of accessibility (e.g., a least restrictive level of accessibility). Processing node 119 may perform functions on the data stored within confidential data database 125 (e.g., access the confidential data, add confidential data, remove confidential data, modify confidential data, or the like). Approval node 120 may be associated with a second level of accessibility (e.g., a more restrictive level of accessibility than the first level of accessibility). Approval node 120 may access and modify the confidential data, but might not be permitted to remove the confidential data within confidential data database 125.

Processing node 119 may receive invoice execution criteria from enterprise organization node 130. The invoice execution criteria may comprise instructions for determining whether the invoice may proceed to execution (e.g., payment). Processing node 119 may use the invoice execution criteria to further analyze the root cause analysis. To do so, processing node 119 may determine whether the suggested solutions remedy each root cause error identified by auto-match node 117. If processing node 119 determines that the suggested solutions do not satisfy the invoice execution criteria, then processing node 119 may transmit a notification to consumer node 140, wherein the notification may comprise a request for consumer node 140 to revise the errors within the invoice such that the invoice may proceed to execution (e.g., payment). Alternatively, if processing node 119 determines that the suggested solutions satisfy the invoice execution criteria, then processing node 119 may transmit a notification to approval node 120, wherein the notification may comprise a request for approval node 120 to finalize the invoice such that the invoice may proceed to execution (e.g., payment).

Processing node 119 may receive, from approval node 120, a request to access the confidential data, wherein the request may comprise identification credentials associated with approval node 120. Processing node 119 may determine whether the received identification credentials are authorized the access the confidential data using verification criteria. If the identification credentials are not authorized to access the confidential data, then processing node 119 may deny the request to access the confidential data. Alternatively, if the identification credentials are authorized to access the confidential data, then processing node 119 may approve the request to access the confidential data. Processing node 119 may receive, from approval node 120, an indication that the invoice may proceed to execution (e.g., payment). Processing node 119 may transmit a notification to enterprise organization node 130 indicating that enterprise organization node 130 may execute the invoice. Machine learning model may store the logic executed by processing node 119 as training data and may use the training data to study the function of processing node 119. As such, machine learning model 128 may be able to replicate the function of processing node 119 on a larger scale (e.g., intelligently and efficiently determine whether the invoice should be transmitted to the enterprise organization for execution, or the like).

Figure 8:
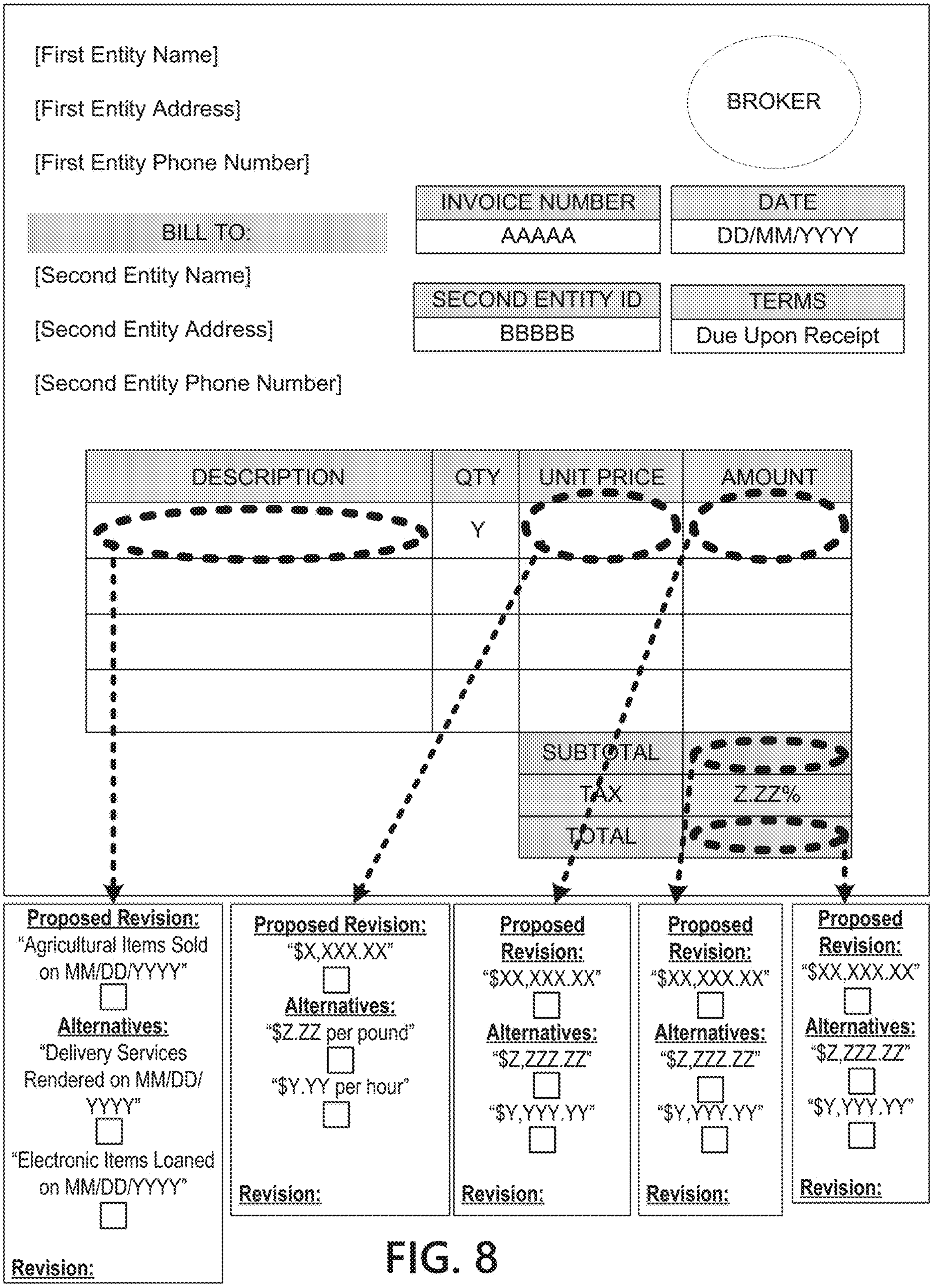
FIG. 8 depicts a sample mixed reality application overlay that may be used for intelligently managing invoice processing using blockchain and mixed reality applications, in accordance with one or more example embodiments.

Approval node 120 may receive, from processing node 119, a request to finalize the invoice. Approval node 120 may transmit, to processing node 119, a request to access the confidential data, wherein the request may comprise identification credentials associated with approval node 120. Approval node 120 may receive access to the confidential data. Approval node 120 may use a mixed reality application or a mixed reality machine to access and revise the confidential data. The mixed reality application and the mixed reality machine may allow approval node 120 to view the confidential data with an added overlay. The added overlay may highlight (e.g., point out, emphasize, or the like) data entry fields that the agent revised, the data in the highlighted data entry field, the agent's proposed revisions to the data in the highlighted data entry field, the agent's suggested alternative revisions to the data in the highlighted data entry field, or the like. The information that may be displayed using the overlay (e.g., the confidential data) might not be visible on the invoice itself. As such, the mixed reality applications and mixed reality machines may provide a secure environment within which approval node 120 may review and revise the confidential data. FIG. 8, discussed below, depicts a sample overlay that may be visible to approval node 120 while using the mixed reality applications and mixed reality machines.

Approval node 120 may revise the invoice (e.g., accept the agent's proposed revisions, reject the agent's proposed revisions, draft revisions, or the like) in real-time or near real-time using the mixed reality application or the mixed reality machine. In doing so, the revisions implemented by approval node 120 may be automatically transmitted to the backend processing (e.g., the revisions may be automatically implemented within confidential data database 125). Automatically implementing the revisions on the backend may allow approval node 120 to transmit revisions without communicating the revisions to other nodes within the P2P blockchain network. In particular, approval node 120 may revise the processed invoice within the confidential data without transmitting the revisions to processing node 119 and without requesting that processing node 119 implement the revisions. Automatically implementing the revisions on the backend may provide an added layer of security. Since the revisions are not transmitted between nodes within the P2P blockchain network, the likelihood of an unauthorized entity gaining unauthorized access to the revisions, and to the confidential data, may be reduced. The more the revisions are transmitted between nodes within the P2P blockchain network, the more the revisions may be susceptible to unauthorized access by an unauthorized entity. Therefore, allowing the revisions to remain within the mixed reality application or the mixed reality machine may increase the security surrounding the revisions and may reduce the likelihood of unauthorized access.

Approval node 120 may compare the confidential data (e.g., the processed invoice, the root cause analysis, the proposed solutions generated by auto-match node 117, the agent within the enterprise organization who processed the invoice, the list of proposed solutions that the agent received from assignment node 118, a log of the agent's revisions to the invoice, or the like) to approval criteria using either a mixed reality application or a mixed reality machine. The approval criteria may comprise instructions for determining whether the processed invoice may proceed to execution (e.g., whether the transaction balance indicated on the processed invoice is correct, whether the account information associated with the entities associated with the processed invoice is correct, whether the transaction indicated on the processed invoice is legitimate, whether the entities associated with the processed invoice are authorized to execute the transaction indicated on the processed invoice, or the like).

If approval node 120 determines that the processed invoice fails to satisfy the approval criteria, then approval node 120 may revise the processed invoice in real-time, or near real-time, using one of the mixed reality application or the mixed reality machine. If approval node 120 determines that the processed invoice satisfies the approval criteria, then approval node 120 may transmit, to enterprise organization node 130 and via one of the mixed reality application or the mixed reality machine, a notification indicating that the processed invoice may proceed to execution (e.g., payment).

Machine learning model 128 may be trained by each node within the P2P blockchain network, as described above. Machine learning model 128 may collect training data from each node and may study the training data to better understand the function and logic of each node. Over time, machine learning model 128 may be able to perform the function of each node within the P2P blockchain network intelligently, efficiently, and on a larger scale.

Figure 2:
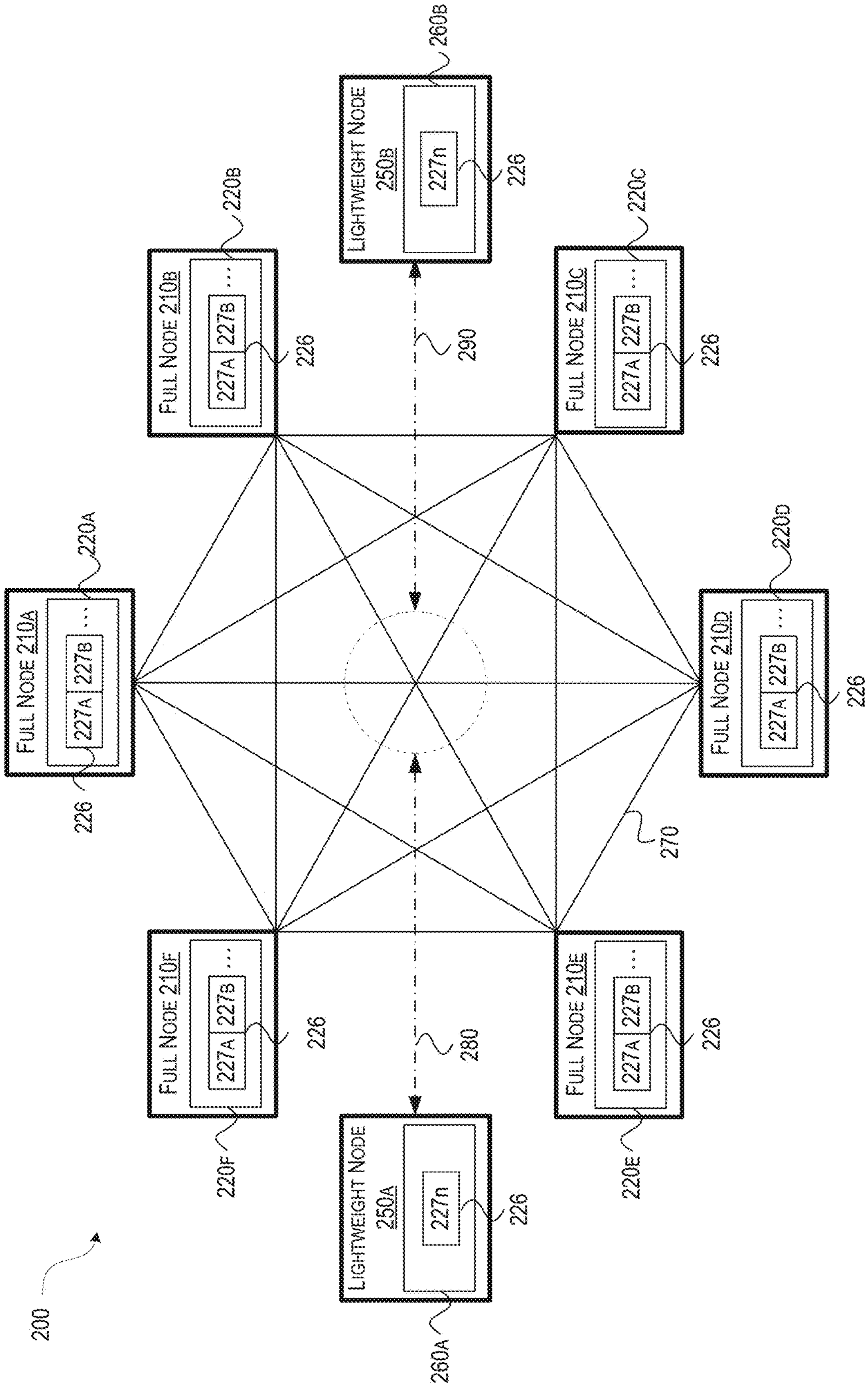
FIG. 2 depicts an illustrative example of a decentralized P2P computer system that may be used for intelligently managing invoice processing using blockchain and mixed reality applications, in accordance with one or more example embodiments.

FIG. 2 depicts an illustrative example of decentralized P2P computer system 200 that may be used for intelligently managing invoice processing in real-time, or near real-time, using blockchain and mixed reality applications. Decentralized P2P computer system 200 may include a plurality of full node computing devices 210A, 210B, 210C, 210D, 210E, and 210F and lightweight node computing devices 250A and 250B, which may be respectively similar to full node computing device 210 described in FIG. 3A and lightweight node computing device 250 described in FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270. Enterprise organization node 130 may be one of full node computing devices 210A-210F as enterprise organization node 130 may cause functions to be executed within decentralized P2P computer system 200.

Lightweight node computing devices 250A and 250B may request execution of network functions related to blockchain 226 in decentralized P2P network 270. In order to request execution of network functions, such as an invoice processing request, processors of lightweight node computing devices 250A and 250B may execute network commands to broadcast the network functions to decentralized P2P network 270 comprising full node computing devices 210A-210F. Consumer node 140 may be one of lightweight node computing devices 250A or 250B as consumer node 140 may submit invoice processing requests to decentralized P2P network 270.

In some arrangements, a plurality of network function requests may be broadcasted across decentralized P2P network 270. Processors, ASIC devices, and/or GPUs of full node computing devices 210A-210F may execute network protocols to receive broadcast of each of the network functions through decentralized P2P network 270 and from the requesting entities, including lightweight node computing devices 250A and 250B.

Figure 3B:
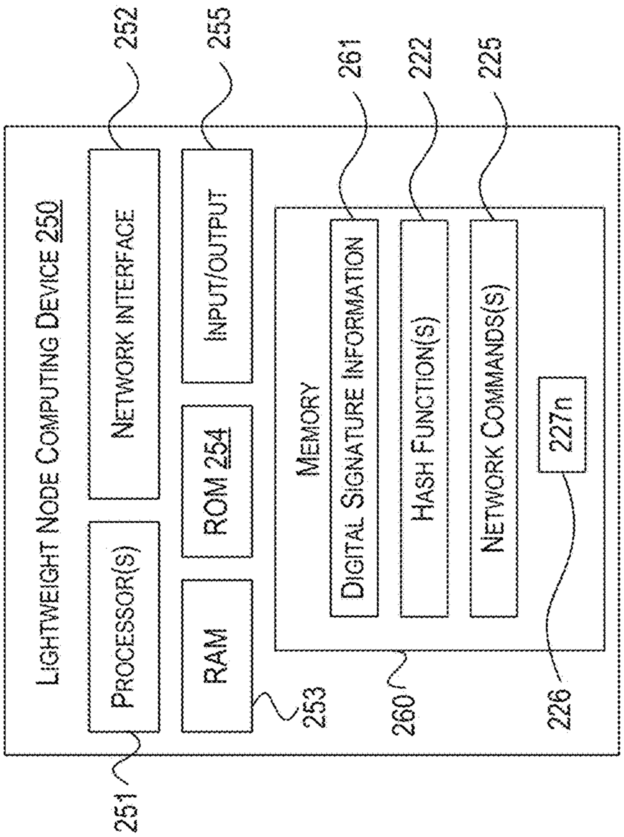
FIG. 3B depicts an illustrative example of a lightweight node computing device that may be used for intelligently managing invoice processing using blockchain and mixed reality applications, in accordance with one or more example embodiments.
Figure 3A:
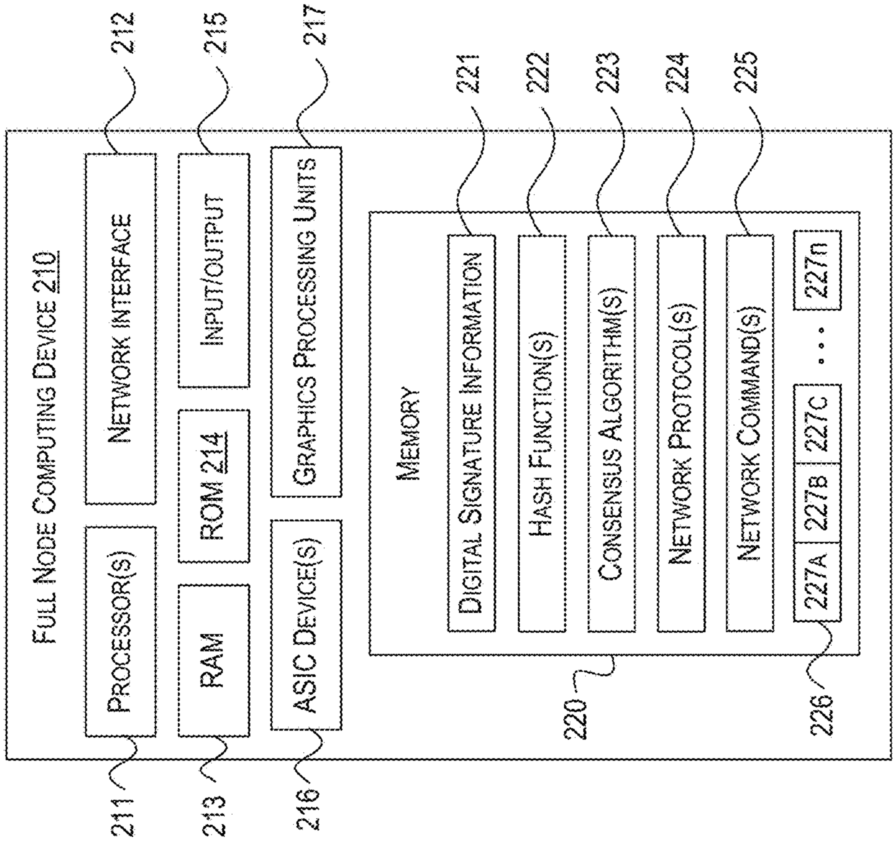
FIG. 3A depicts an illustrative example of a full node computing device that may be used for intelligently managing invoice processing using blockchain and mixed reality applications, in accordance with one or more example embodiments.

FIG. 3A depicts an illustrative example of a full node computing device 210 that may be used for intelligently managing invoice processing in real-time, or near real-time, using blockchain and mixed reality applications in accordance with one or more aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and to request execution of network functions, and/or to execute requested network functions and to maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

In order to request execution of network functions, such as a consumer-initiated invoice processing request, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221. In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node.

Memory 220 of full node computing device 210 may store blockchain 226. Blockchain 226 may include blocks 227A, 227B, 227C, . . . 227*n*, wherein block 227A represents the first block (e.g., genesis block) of blockchain 226 and block 227*n* represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used for intelligently managing invoice processing in real-time, or near real-time, using blockchain and mixed reality applications. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, or the like, and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it might not be configured to execute network functions and/or to maintain a blockchain of a decentralized P2P network. In other aspects, lightweight node computing device 250 may have substantially the same physical configuration as full node computing device 210, but may be configured with different programs and/or software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary support and/or other functionality, which may or might not be used in conjunction with aspects described herein.

In comparison to full node computing device 210, lightweight node computing device 250 might not include, in some instances, specialized hardware such as ASIC devices 216 and/or GPUs 217. This may be because lightweight node computing device 250 might not be configured to execute network functions and/or to maintain a blockchain of a decentralized P2P network as is full node computing device 210.

Memory 260 of lightweight node computing device 250 may store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210. Each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. The private/public key information of each node, whether full or lightweight, in a decentralized P2P computing network may be unique to that particular node.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as a consumer-initiated invoice processing request, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Intelligently Managing Invoice Processing in Real-Time, or Near Real-Time, Using Blockchain and Mixed Reality Applications FIGS. 4A-4M depict an illustrative event sequence for intelligently managing invoice processing in real-time, or near real-time, using blockchain and mixed reality applications in accordance with one or more aspects described herein. While aspects described with respect to FIG. 4A to FIG. 8 include the evaluation of a single invoice, a plurality of invoices may be received and evaluated (e.g., in parallel) without departing from the present disclosure.

Figure 4A:
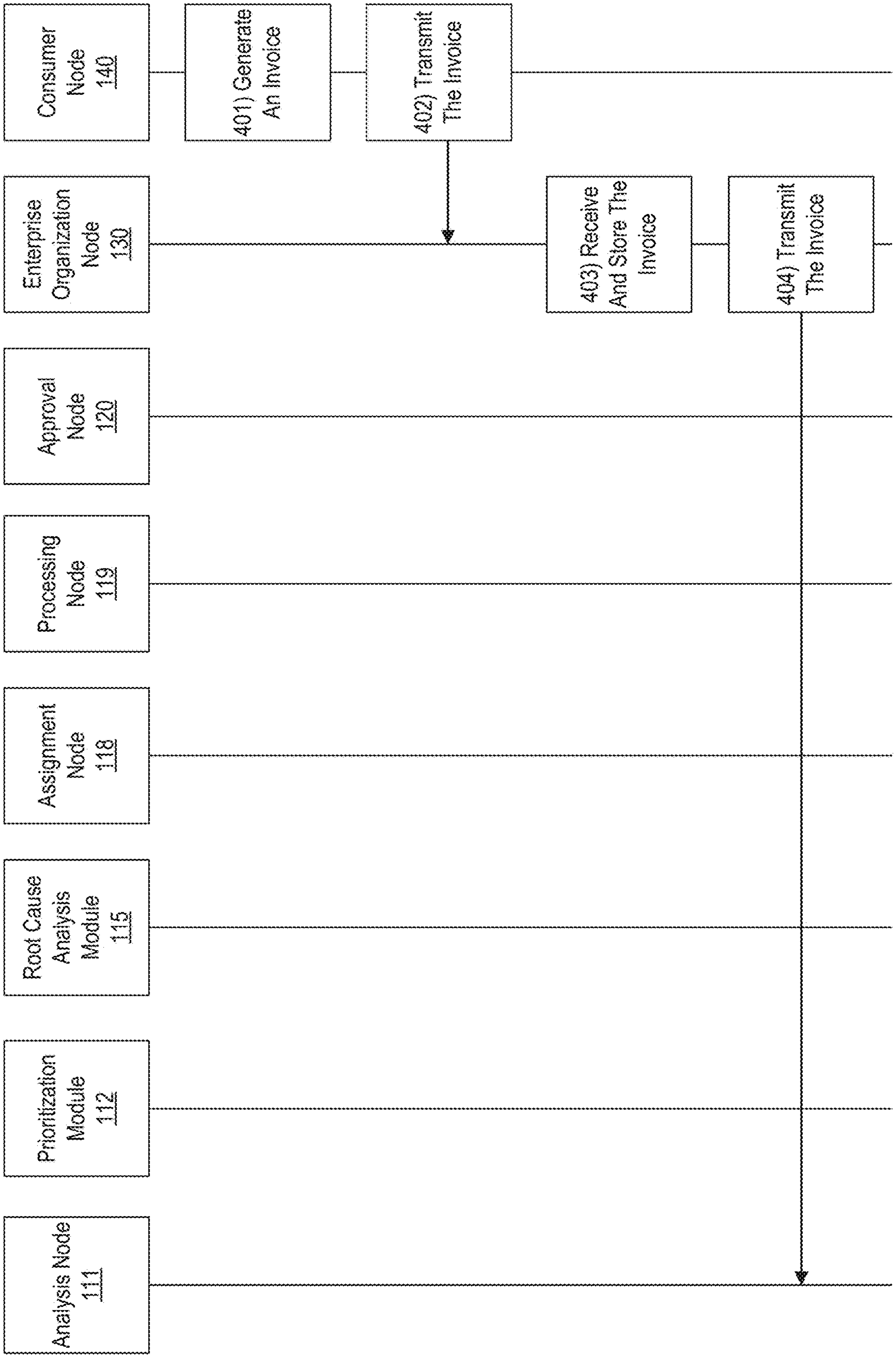
FIGS. 4A-4M depict an illustrative event sequence for intelligently managing invoice processing using blockchain and mixed reality applications, in accordance with one or more example embodiments.

Referring to FIG. 4A, at step 401, consumer node 140 may generate an invoice. The invoice may indicate a transaction (e.g., a service provided to an entity), entities associated with the transaction (e.g., an entity that provided the service, an entity that received the service, an entity that is responsible for payment of the invoice, or the like), and a monetary amount that is associated with the transaction. Consumer node 140 may be associated with a financial institution (e.g., a broker).

At step 402, consumer node 140 (e.g., the broker) may transmit the invoice to enterprise organization node 130. Consumer node 140 may transmit the invoice to enterprise organization node 130 across network 150. At step 403, enterprise organization node 130 may receive the invoice and may store the invoice in invoice data database 121. At step 404, enterprise organization node 130 may transmit the invoice to analysis node 111. Enterprise organization node 130 may transmit the invoice to analysis node 111 across network 150.

Figure 4B:
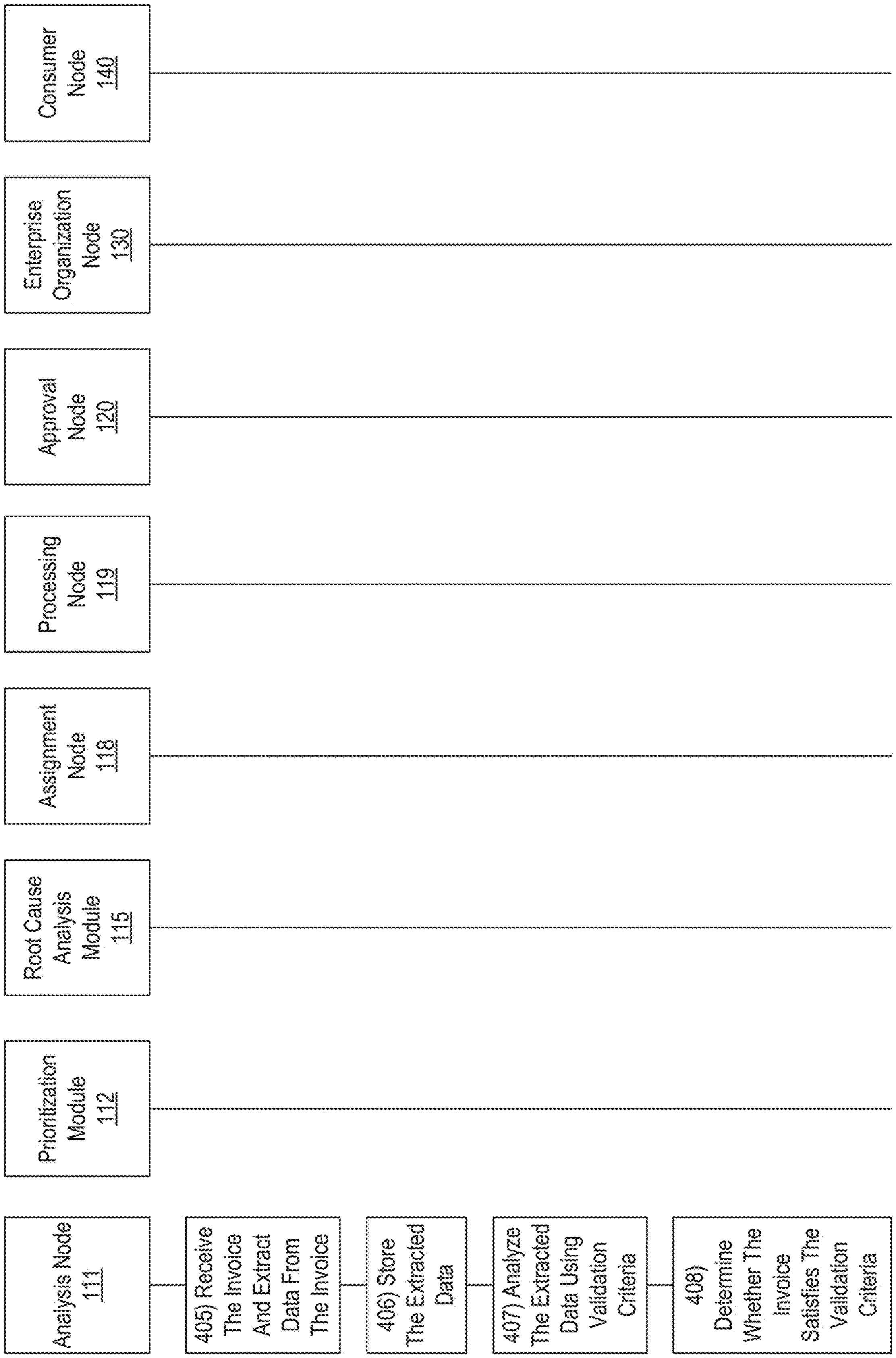
Figure 4C:
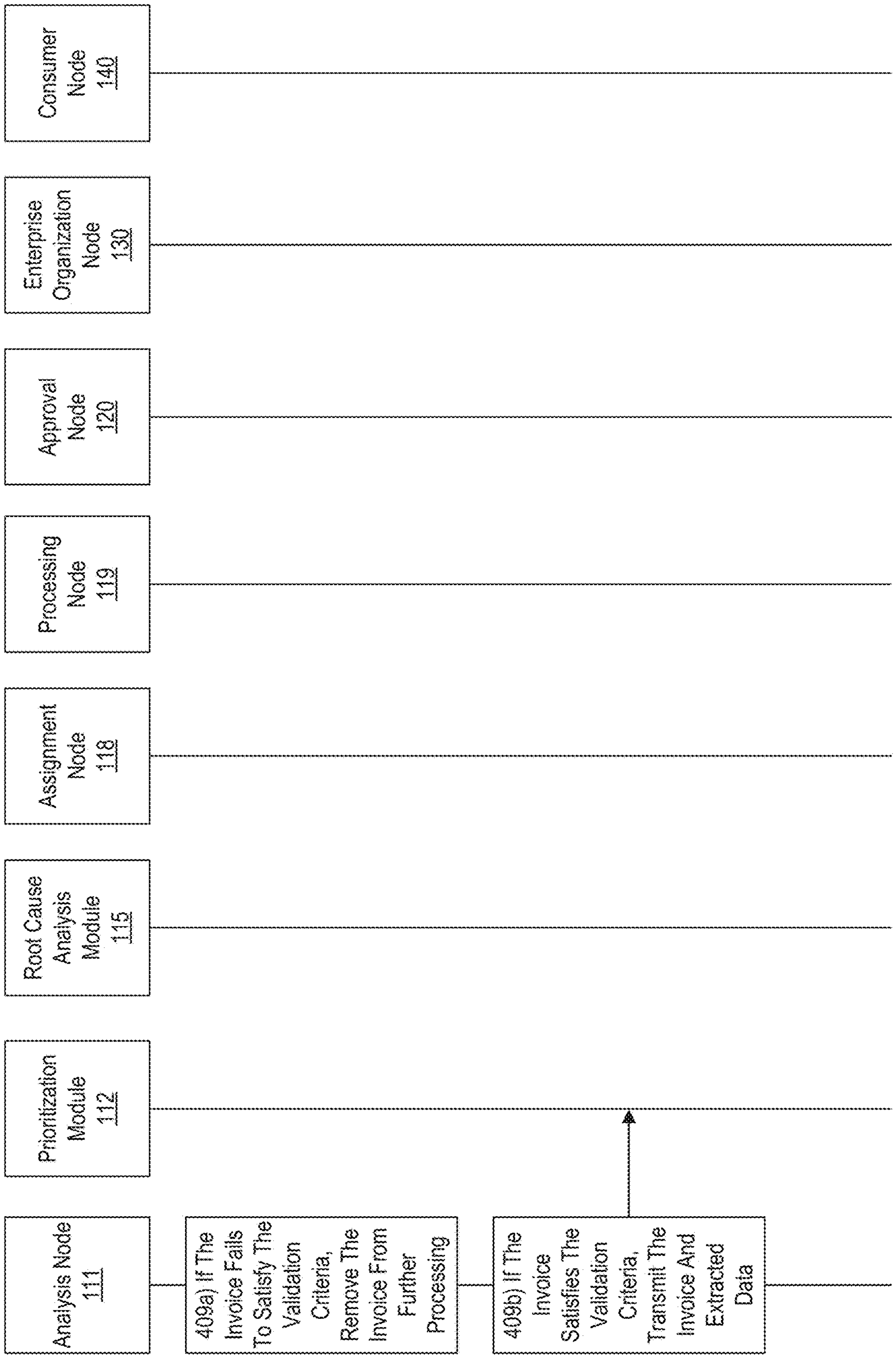
Figure 6:
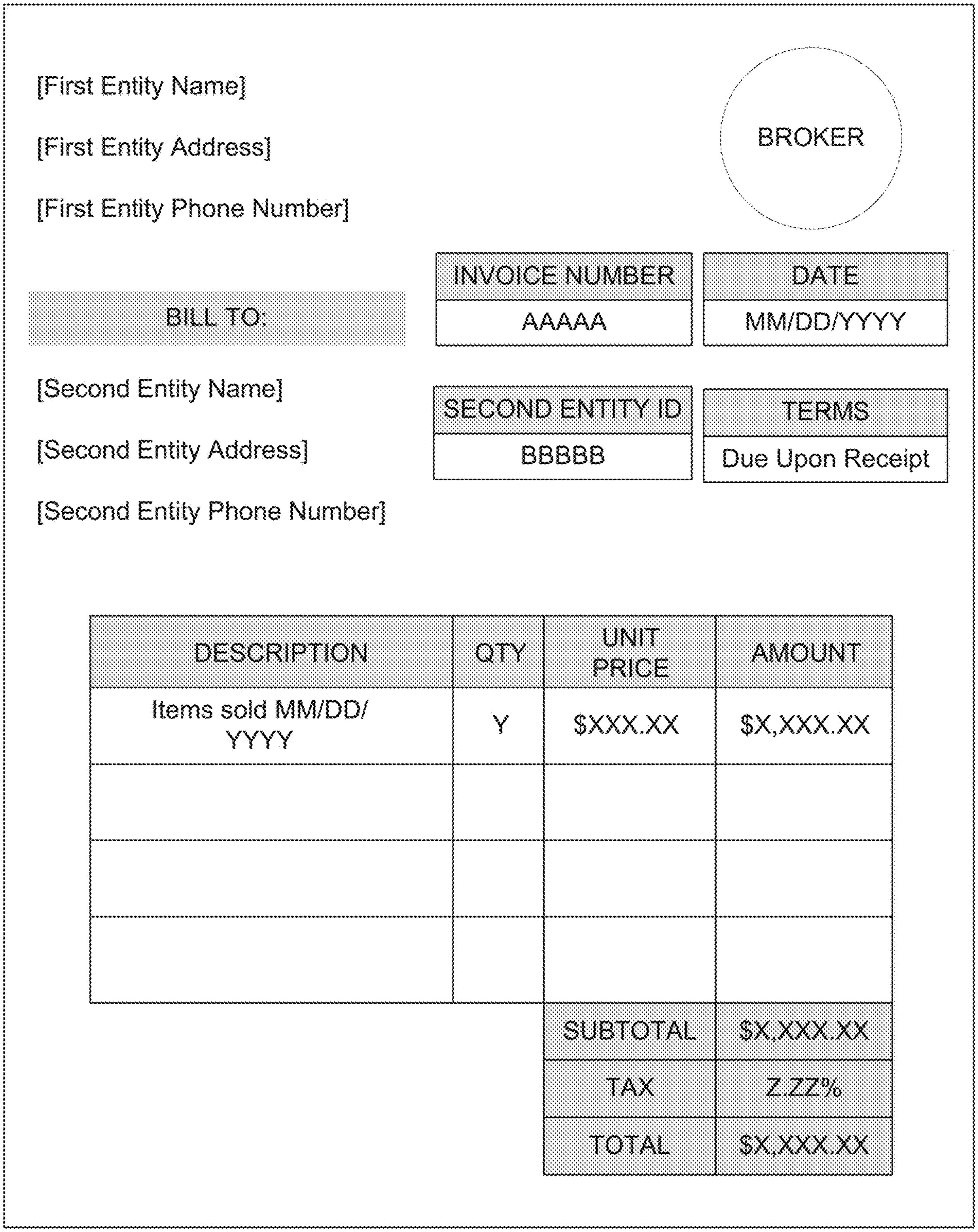
FIG. 6 depicts a sample invoice that may be intelligently managed using blockchain and mixed reality applications, in accordance with one or more example embodiments.

Referring to FIG. 4B, at step 405, analysis node 111 may receive the invoice from enterprise organization node 130. Analysis node 111 may analyze the invoice and may extract data from the invoice (e.g., a number of data entry fields that are populated, a number of data entry fields that are not populated, whether the received invoice is blank, or the like). FIG. 6 depicts a sample invoice. As illustrated in FIG. 6, analysis node 111 may extract information from the invoice, including a first entity associated with the invoice, a second entity associated with the invoice, an invoice number (e.g., AAAAA), a date that the invoice was generated (e.g., MM/DD/YYYY), an identification number associated with the entity responsible for execution (e.g., payment) of the invoice (e.g., BBBBB), terms associated with the invoice (e.g., an indication that the amount indicated on the invoice is due upon receipt of the invoice), a description of the items sold or the services rendered (e.g., items sold MM/DD/YYYY), a quantity of items sold, a unit price associated with a single item, a subtotal (e.g., $X,XXX.XX), a tax rate (e.g., Z.ZZ %), and a total amount associated with the invoice. At step 406, analysis node 111 may store the extracted data in invoice data database 121.

At step 407, analysis node 111 may analyze the extracted data to determine whether the invoice should undergo further processing. To analyze the extracted data, analysis node 111 may use validation criteria generated by enterprise organization node 130. The validation criteria may set forth requirements that analysis node 111 may use to determine whether the invoice should be processed further (e.g., whether the invoice contains data entry fields, whether the invoice contains data entry fields that require a response, whether the required data entry fields are populated, whether the responses within the populated data entry fields conform to an expected format, whether the invoice matches a previously received invoice stored in historic invoices database 122, or the like).

For example, analysis node 111 may determine a number of data entry fields on the invoice and may determine a number of populated data entry fields on the invoice. Analysis node 111 may determine that the invoice is comprised of thirteen data entry fields and that all thirteen data entry fields are populated.

For example, analysis node 111 may access the data within historic invoices database 122 to determine whether the invoice is a duplicate invoice. Access to historic invoices database 122 may differ depending on the node that is requesting access (e.g., a hierarchy of accessibility). Enterprise organization node 130 may be associated with a first level of accessibility (e.g., a least restrictive level of accessibility). Enterprise organization node 130 may perform functions on the data stored within historic invoices database 122 (e.g., access the historic invoices, remove the historic invoices, or the like). Analysis node 111 may be associated with a second level of accessibility (e.g., a more restrictive level of accessibility than the first level of accessibility). Analysis node 111 may view the historic invoices, but might not be permitted to add, remove, or modify the historic invoices within historic invoices database 122.

At step 408, analysis node 111 may determine whether the invoice satisfies the validation criteria. If, at step 408, analysis node 111 determines that the invoice fails to satisfy the validation criteria, then, referring to FIG. 4C, at step 409*a*, analysis node 111 may remove the invoice from further processing. For example, analysis node 111 may determine that the invoice is comprised of thirteen data entry fields, but only five data entry fields are populated. As such, analysis node 111 may, at step 409*a*, remove the invoice from further processing for failure to satisfy the validation criteria. Alternatively, if, at step 408, analysis node 111 determines that the invoice satisfies the validation criteria, then, at step 409*b* in FIG. 4C, analysis node 111 may transmit the invoice and the extracted data to prioritization module 112.

Figure 4D:
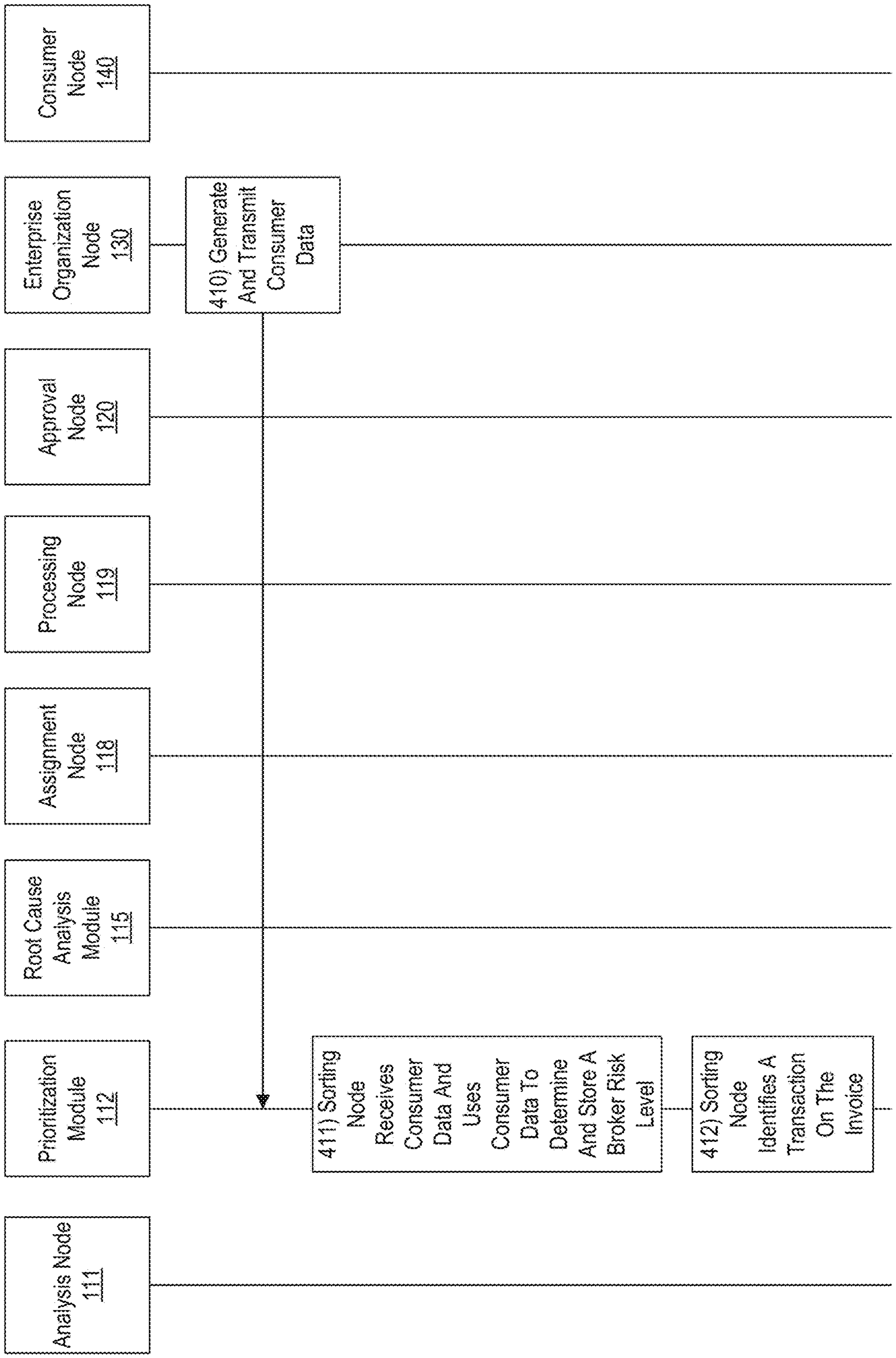

Referring to FIG. 4D, at step 410, enterprise organization node 130 may generate consumer data that describes consumer node 140 (e.g., the broker that generated the invoice in step 401). The consumer data may describe the broker's location, a number of invoices previously submitted by the broker, a number of approved invoices associated with the broker, a number of rejected invoices associated with the broker, monetary values associated with the invoices that were previously submitted by the broker, or the like. Enterprise organization node 130 may transmit the consumer data to prioritization module 112.

At step 411, sorting node 113 of prioritization module 112 may receive the consumer data and may use the consumer data to determine a risk level associated with consumer node 140 (e.g., the broker). To determine a risk level associated with consumer node 140, sorting node 113 may generate a hierarchy of factors using the consumer data (e.g., the number of rejected broker invoices may be assigned a greater weight than the broker's location). Sorting node 113 may assign a weight to each factor within the hierarchy of factors. Sorting node 113 may use the weighted factors to determine a weighted average associated with consumer node 140, wherein the weighted average may be the risk level associated with consumer node 140. Sorting node 113 may store the risk level associated with consumer node 140 within invoice data database 121.

At step 412, sorting node 113 may identify a transaction on the invoice generated by consumer node 140 in step 401. To do so, sorting node 113 may retrieve the invoice from invoice data database 121. Sorting node 113 may analyze each data entry field on the invoice to identify the data entry field that describes a product that was sold by a first entity and purchased by a second entity, a service that was provided by a first entity and to a second entity, or the like. Sorting node 113 may parse the language within the identified data entry field to determine the nature of the transaction indicated on the invoice.

For example, as illustrated in FIG. 6, sorting node 113 may analyze each data entry field. Sorting node 113 may determine that the data entry field entitled "DESCRIPTION" contains a description of the items sold by the first entity and purchased by the second entity. Sorting node 113 may parse the language within the "DESCRIPTION" data entry field to determine the items that were sold and the date on which the items were sold.

Figure 4E:
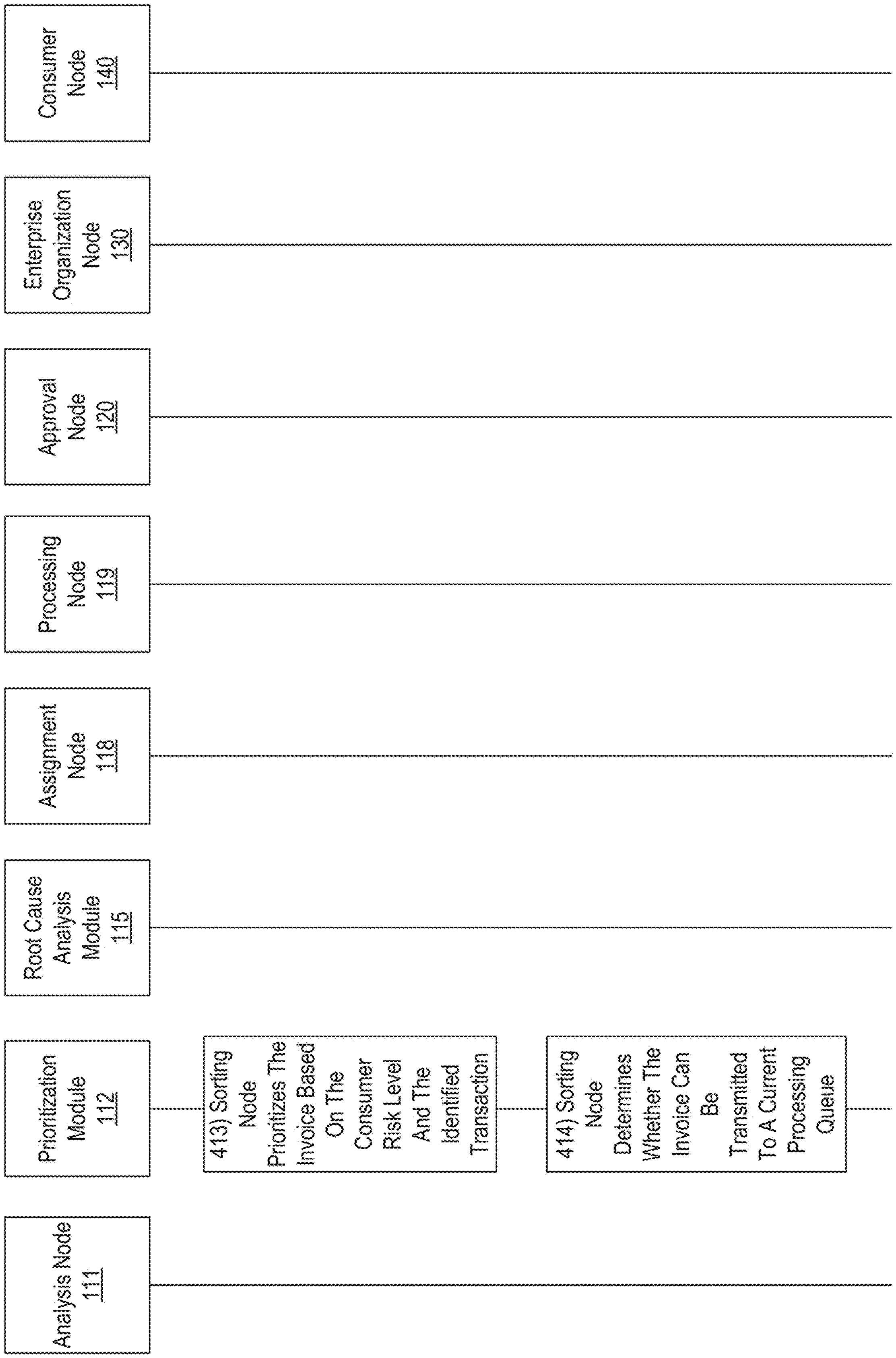
Figure 4F:
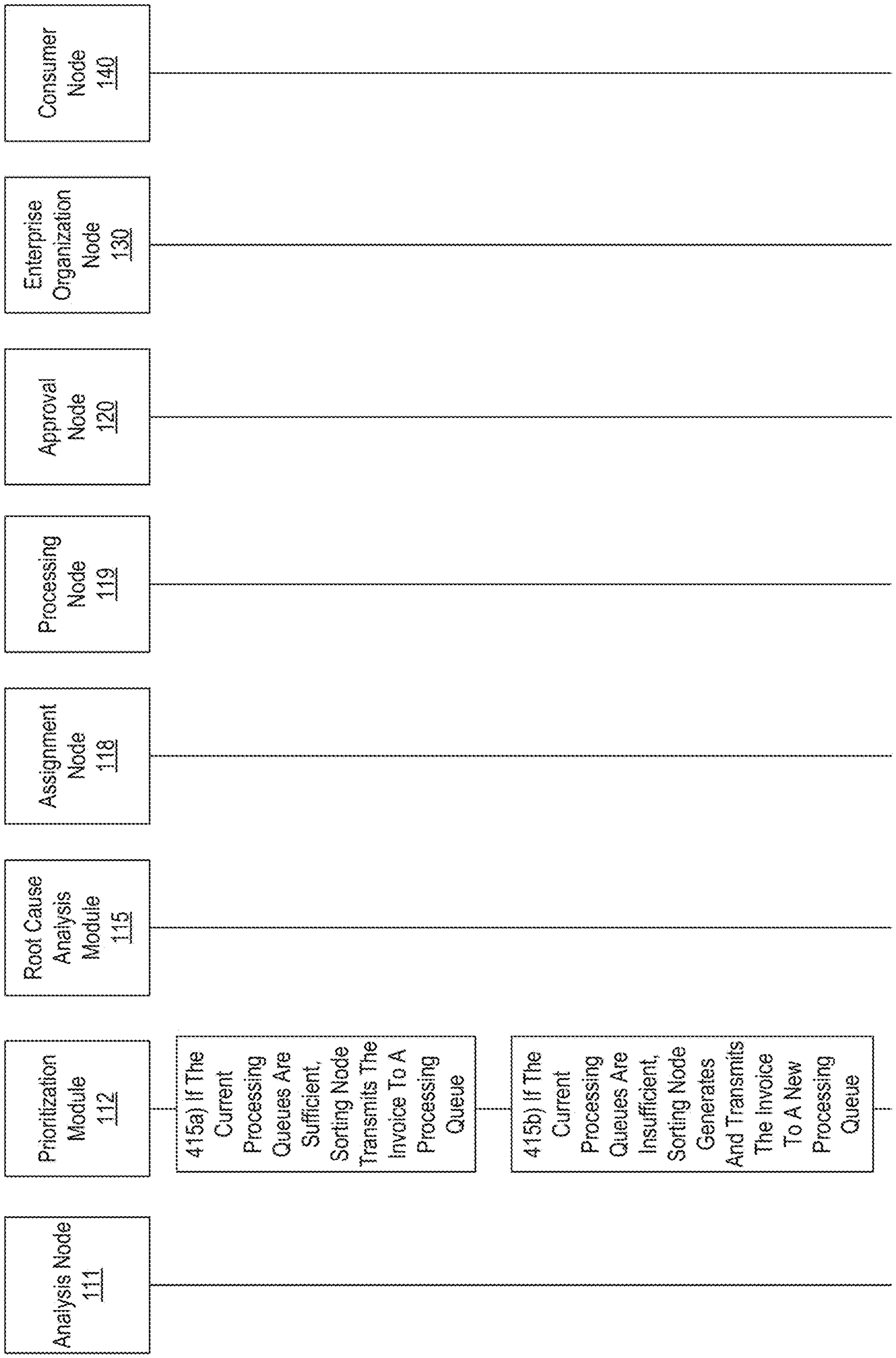

Referring to FIG. 4E, at step 413, sorting node 113 may prioritize the invoice based on the determined risk level associated with consumer node 140 and based on the transaction indicated on the invoice. To prioritize the invoice, sorting node 113 may transmit the invoice to a processing queue of a plurality of current processing queues. Each processing queue may correspond to a risk level associated with consumer node 140 (e.g., invoices associated with trustworthy brokers may be transmitted to a first processing queue of the plurality of current processing queue, invoices associated with brokers that might not be trustworthy may be transmitted to a second processing queue of the plurality of current processing queues, or the like) or may correspond to a transaction indicated on the invoice (e.g., invoices that indicate a sale of goods may be transmitted to a third processing queue of the plurality of current processing queues, invoices that indicate a provided service may be transmitted to a fourth processing queue of the plurality of current processing queues, or the like).

In some instances, to determine the processing queue to which the invoice should be transmitted, sorting node 113 may determine whether the risk level associated with the broker associated with the invoice corresponds to the risk level of the brokers associated with the invoices within a current processing queue. For example, sorting node 113 may determine that the broker associated with the invoice is a trustworthy broker. Sorting node 113 may also determine that invoices associated with trustworthy brokers are transmitted to a first processing queue (e.g., a high priority processing queue). As such, sorting node 113 may transmit the invoice to the first processing queue of the plurality of current processing queues.

In some instances, to determine the processing queue to which the invoice should be transmitted, sorting node 113 may determine whether the transaction indicated on the invoice corresponds to the transactions indicated on the invoices within current processing queues. For example, sorting node 113 may determine that the transaction indicated on the invoice is for a sale of agricultural goods. Sorting node 113 may also determine that invoices for the sale of agricultural goods are transmitted to a fourth processing queue and, as such, may transmit the invoice to the fourth processing queue of the current processing queues.

At step 414, sorting node 113 may determine, based on the information from step 413, whether the invoice can be transmitted to a processing queue within the plurality of current processing queues. If, at step 414, sorting node 113 determines that the invoice can be transmitted to a processing queue of the plurality of current processing queues, then, referring to FIG. 4F, at step 415*a*, sorting node 113 may transmit the invoice to the processing queue of the plurality of current processing queues that corresponds to the invoice. Alternatively, if, at step 414, sorting node 113 determines that the invoice does not correspond to a processing queue of the plurality of current processing queues, then, at step 415*b* in FIG. 4F, sorting node 113 may generate a new processing queue and may transmit the invoice to the new processing queue.

Figure 4G:
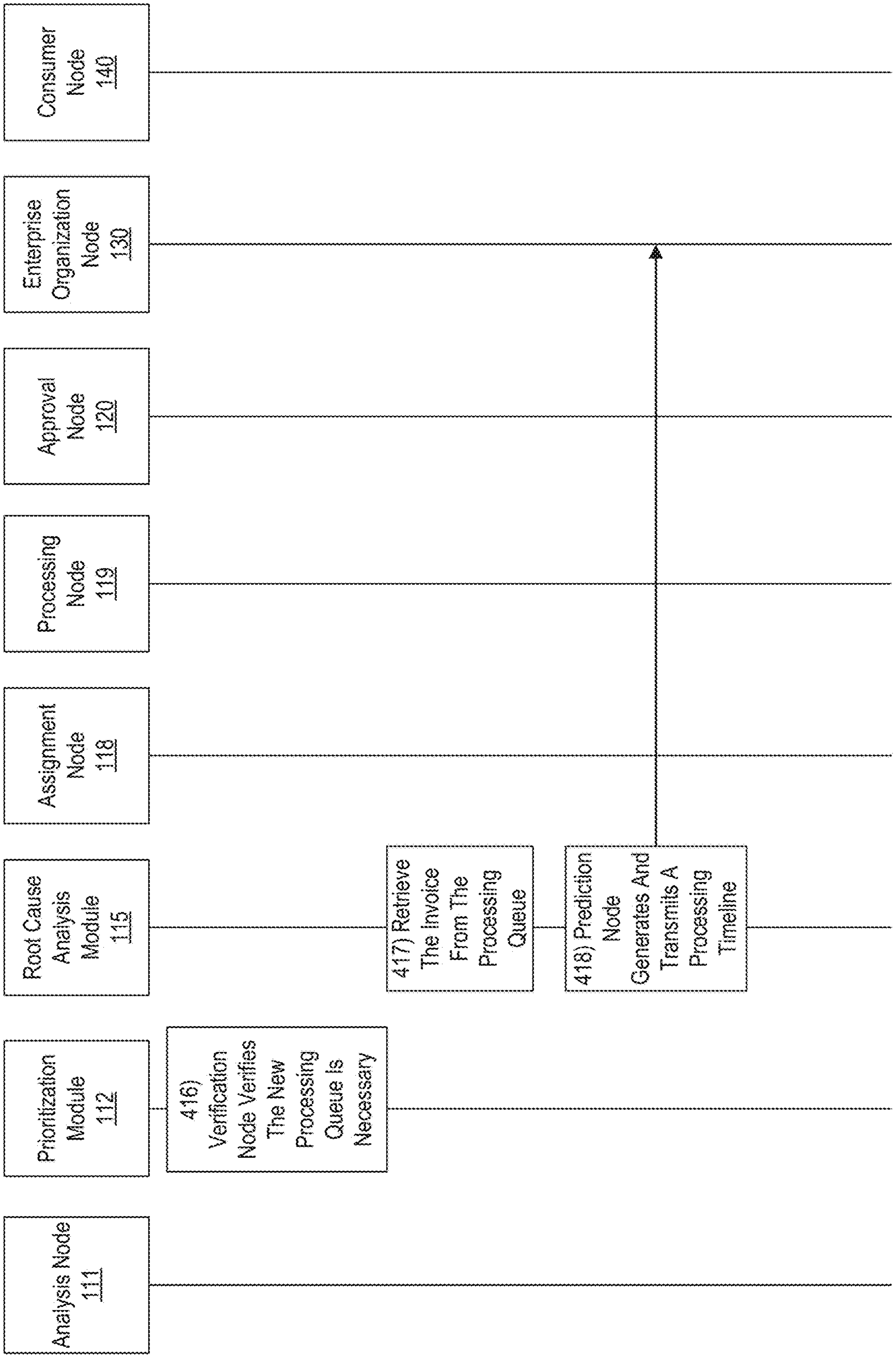

If, at step 415*b*, sorting node 113 generates a new processing queue, then, referring to FIG. 4G, at step 416, sorting node 113 may instruct verification node 114 to verify the new processing queue. To verify the new processing queue, verification node 114 may retrieve the invoice within the new processing queue. Verification node 114 may identify the transaction associated with the invoice and the risk level associated with the broker that is associated with the invoice. Verification node 114 may determine whether the type of transaction indicated on the invoice corresponds to the transactions associated with current processing queues. Additionally, verification node 114 may determine whether the risk level of the broker that is associated with the invoice corresponds to the risk level associated with the brokers associated with the invoices in current processing queues. If verification node 114 determines that the invoice within the new processing queue is substantially similar (e.g., the priority levels of the entities associated with the invoice match the priority levels of the entities associated with the invoices within the current processing queues, the risk level of the broker associated with the invoice matches the risk levels of the brokers associated with the invoices within the current processing queues, the nature of the transaction indicated on the invoice matches the nature of the transactions indicated on the invoices within the current processing queues, or the like) to the invoices within a current processing queue, then verification node 114 may instruct sorting node 113 to remove the invoice from the new processing queue and to transmit the invoice to a current processing queue. Alternatively, if verification node 114 determines that the invoice within the new processing queue is not substantially similar (e.g., the priority levels of the entities associated with the invoice are different from the priority levels of the entities associated with the invoices within the current processing queues, the risk level of the broker associated with the invoice is different from the risk levels of the brokers associated with the invoices within the current processing queues, the nature of the transaction indicated on the invoice is different from the nature of the transactions indicated on the invoices within the current processing queues, or the like) to the invoices within a current processing queue, then verification node 114 may add the new processing queue to the plurality of current processing queues.

At step 417, root cause analysis module 115 may retrieve the invoice from the processing queue to which it was transmitted in either one of steps 415*a* or 415*b*. At step 418, prediction node 116 of root cause analysis module 115 may access the data associated with the invoice that is stored within invoice data database 121 (e.g., the data extracted from the invoice, the risk level associated with the broker that is associated with the invoice, or the like). Prediction node 116 may use the data within invoice data database 121 to predict an amount of time that may be needed to process the invoice (e.g., whether the invoice may be processed without revisions from the broker, whether further information may be needed from the broker, whether the data entry fields within the invoice are fully populated, or the like). Prediction node 116 may transmit the prediction to enterprise organization node 130.

Figure 7:
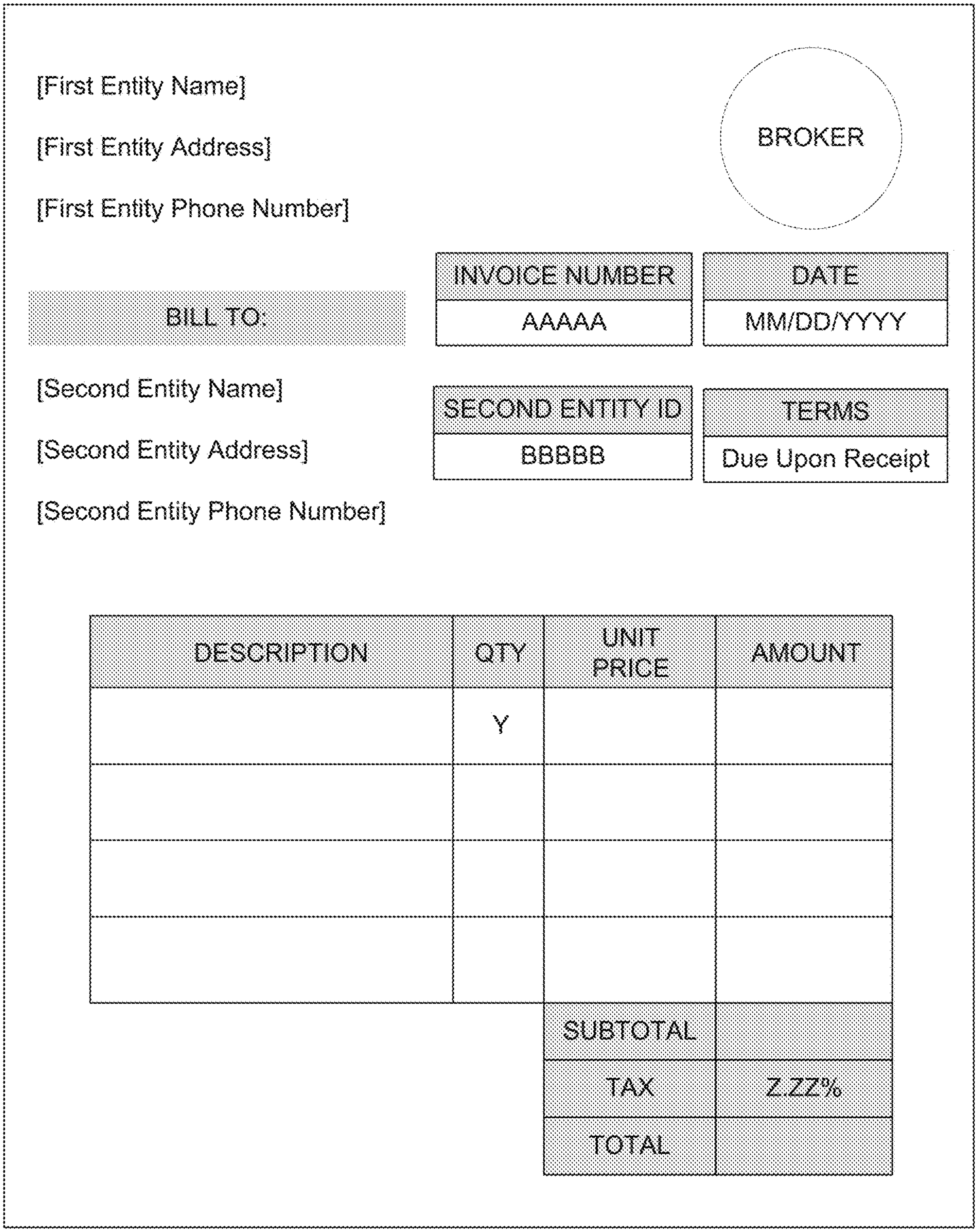
FIG. 7 depicts a modified sample invoice that may be intelligently managed using blockchain and mixed reality applications, in accordance with one or more example embodiments.

For example, prediction node 116 may determine that at least one data entry field within the invoice is not populated. FIG. 7 depicts a modified sample invoice. As illustrated in FIG. 7, prediction node 116 may determine that the invoice contains thirteen data entry fields and that five data entry fields are not populated. Prediction node 116 may determine that further information may be needed from the broker to finalize the invoice (e.g., a description of the transaction, a balance associated with the transaction, or the like). As such, prediction node 116 may determine that further information is needed from the broker and the invoice cannot be processed immediately. Prediction node 116 may transmit this prediction to enterprise organization node 130.

Figure 4H:
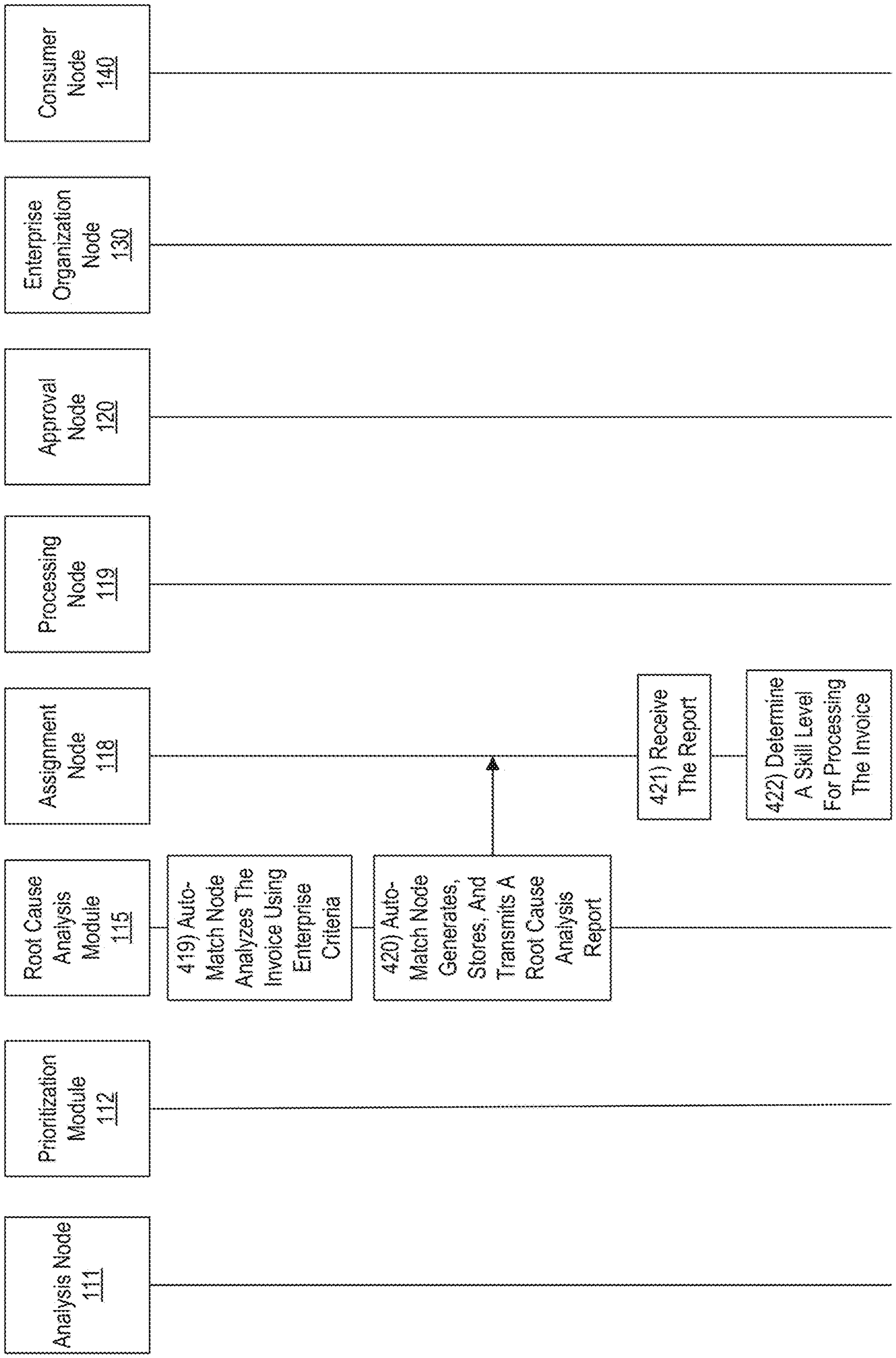
Figure 4I:
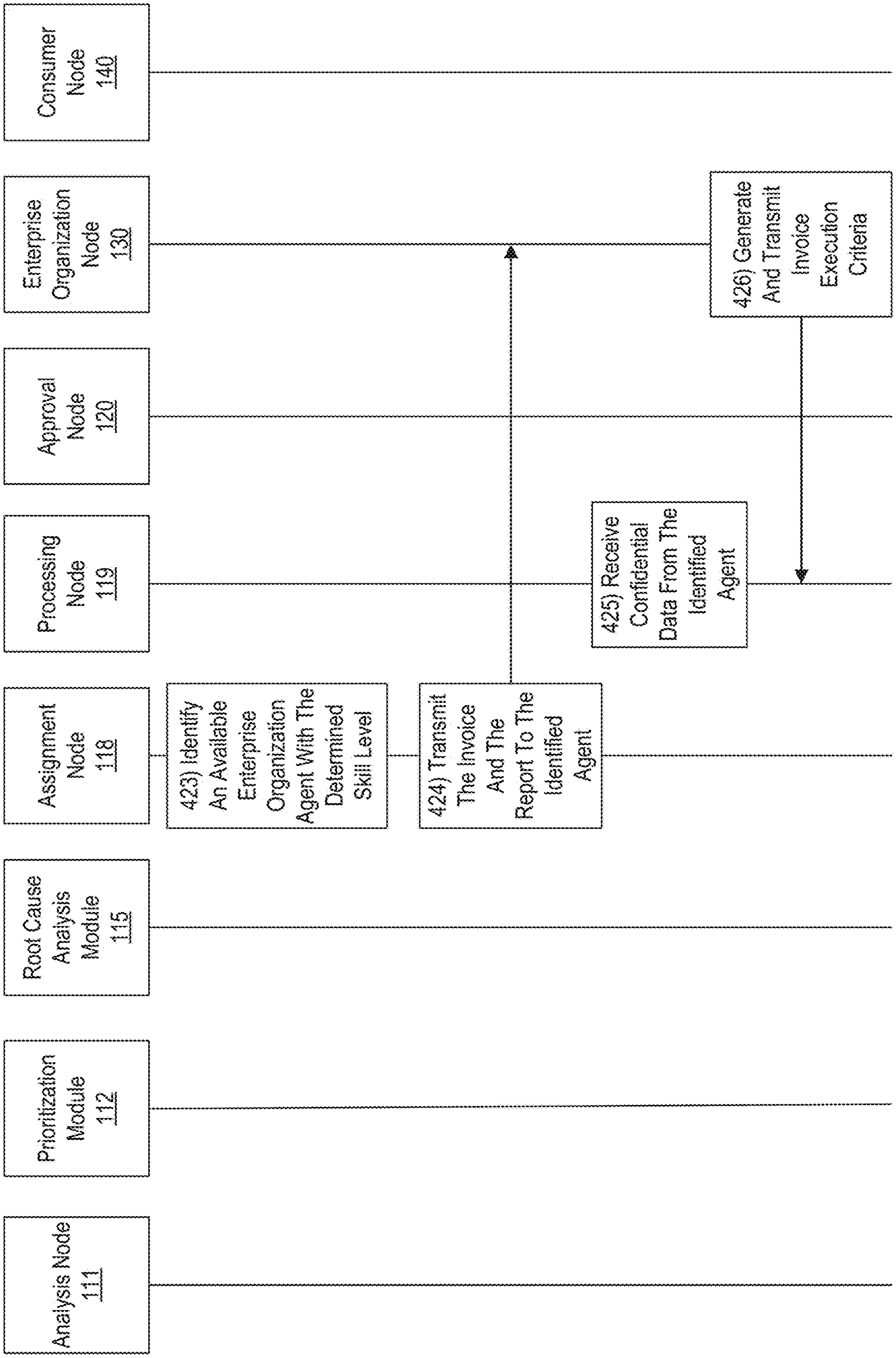

Referring to FIG. 4H, at step 419, auto-match node 117 of root cause analysis module 115 may analyze the invoice using enterprise criteria. Auto-match node 117 may continuously receive enterprise criteria from enterprise organization node 130. The enterprise criteria may contain instructions for determining whether the invoice satisfies requirements set forth by the enterprise organization (e.g., whether the transaction indicated on the invoice is recorded within a transaction history associated with an entity that is associated with the invoice, whether the transaction indicated on the invoice is indicated within an entity account history, whether a balance indicated on the invoice matches an amount within an entity account, or the like). Auto-match node 117 may determine whether the invoice satisfies each factor within the enterprise criteria. If the invoice does not satisfy a factor within the enterprise criteria, then auto-match node 117 may maintain a list of the factors that the invoice failed to satisfy (e.g., a list of root cause errors). For each root cause error, auto-match node 117 may generate a list of proposed solutions to remedy the root cause error. To generate the list of proposed solutions to the root cause errors, auto-match node 117 may determine whether similar root cause errors were previously identified, the proposed solution(s) for each previously identified root cause error that is similar to the present root cause error, and whether the proposed solution(s) were successful.

At step 420, auto-match node 117 may generate a root cause analysis report. To generate the root cause analysis report, auto-match node 117 may compile the list of root cause errors and the list the proposed solution(s) that accompanies each identified root cause error. The root cause analysis report may also indicate the invoice as well as the enterprise criteria that auto-match node 117 used to analyze the invoice. Auto-match node 117 may store the root cause analysis report in root cause database 123 and may transmit a copy of the root cause analysis report to assignment node 118. At step 421, assignment node 118 may receive the root cause analysis report from auto-match node 117.

At step 422, assignment node 118 may determine a skill level associated with processing the invoice (e.g., whether the invoice can be processed by a junior agent within the enterprise organization, whether the invoice should be processed by a senior agent within the enterprise organization, whether a specific agent or agent with specific skills within the enterprise organization handles the invoices associated with a particular entity, or the like). To determine the skill level associated with processing the invoice, assignment node 118 may review the root cause analysis report. Assignment node 118 may use the list of root causes errors and the list of proposed solutions to estimate the skill level. For example, where the root cause analysis report indicates that further information is needed from the broker because the invoice contains blank data entry fields, then assignment node 118 may determine that a junior agent may be capable of communicating with the broker to populate the invoice. Alternatively, for example, where the root cause analysis report indicates that the transaction indicated on the invoice does not correspond to the account history of an entity associated with the transaction, then assignment node 118 may determine that a senior agent should handle the invoice as the senior agent may be familiar with accessing entity accounts and remedying inaccuracies within an entity account history.

Assignment node 118 may store the determined skill level in availability and skills database 124.

Referring to FIG. 41, at step 423, assignment node 118 may identify an agent within the enterprise organization who has the determined skill level to handle the invoice and who is available to handle the invoice. Assignment node 118 may retrieve, from availability and skills database 124, data indicating the availability of agents within the enterprise organization and the skill level of agents within the enterprise organization. Assignment node 118 may compare the determined skill level to the skill level of agents within the enterprise organization. Assignment node 118 may identify at least one agent within the enterprise organization whose skill level may be sufficient to process the invoice. Assignment node 118 may consider the availability of the identified agents to determine whether at least one agent is available to process the invoice. At step 424, assignment node 118 may transmit the invoice and the root cause analysis report to the identified agent within the enterprise organization with the skill level and availability to process the invoice.

At step 425, processing node 119 may receive confidential data from the agent identified in step 423. The confidential data may comprise a root cause analysis associated with the invoice processed by the agent, wherein the root cause analysis may comprise suggested solutions, determined by the agent, to remedy the identified root cause errors within the invoice. The confidential data may also comprise a description of the agent's revisions to the processed invoice (e.g., the data entry field that the agent revised, the data in the data entry field prior to the agent's revisions, the agent's revision to the data entry field, the data in the data entry field after the agent's revisions, the agent's suggested alternative revisions to the data entry field, or the like). Processing node 119 may store the confidential data within confidential data database 125.

At step 426, enterprise organization node 130 may generate invoice execution criteria. The invoice execution criteria may comprise instructions for determining whether the invoice may proceed to execution (e.g., payment). The invoice execution criteria may consider whether the processed invoice contains correct balance, whether each data entry field is populated, whether the correct entity is indicated as responsible for execution of the invoice, whether the account history for each entity correctly indicates the transaction indicated on the invoice, or the like. Enterprise organization node 130 may transmit the invoice execution criteria to processing node 119.

Figure 4J:
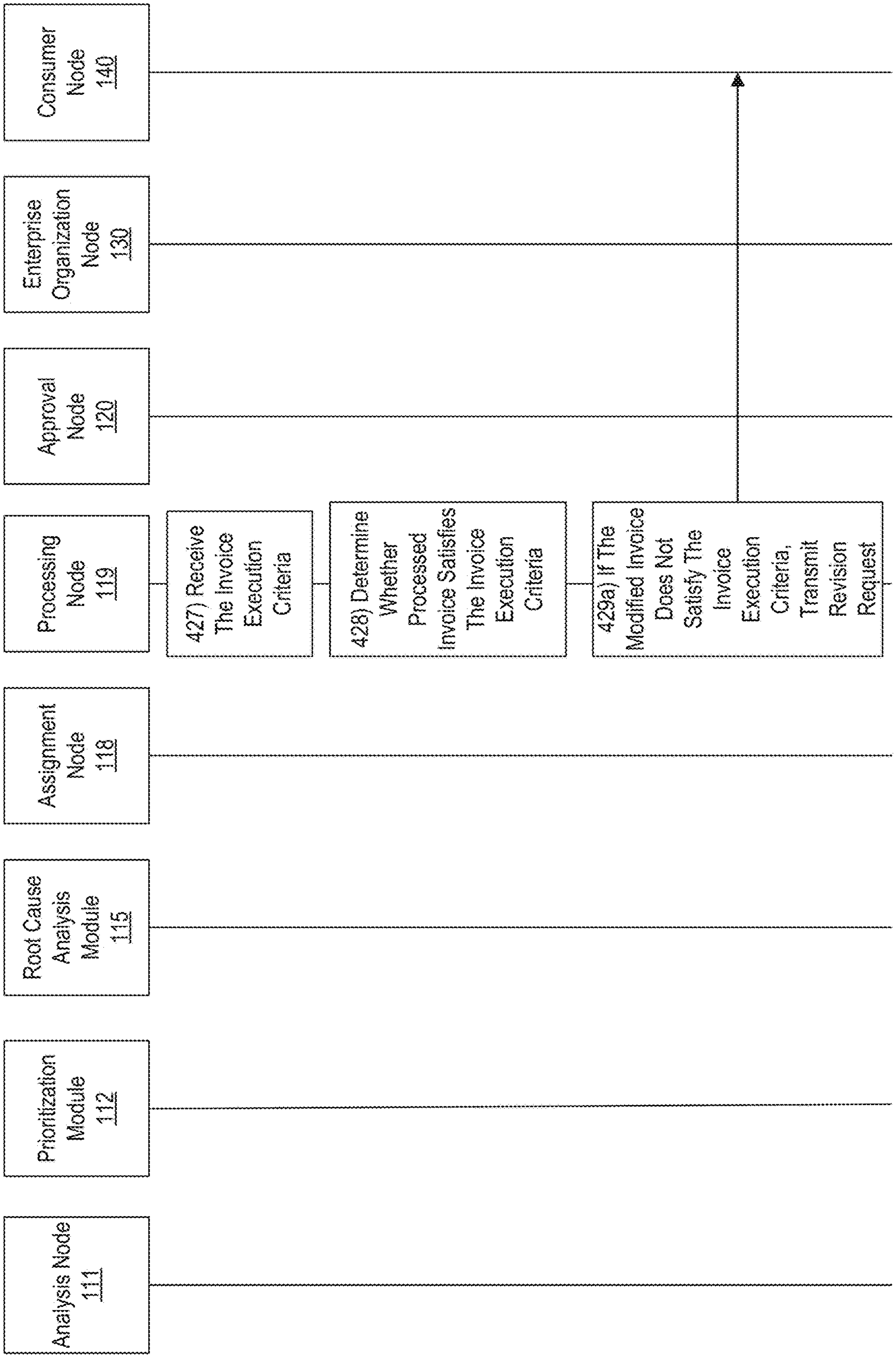

Referring to FIG. 4J, at step 427, processing node 119 may receive the invoice execution criteria. At step 428, processing node 119 may determine whether the invoice processed by the agent satisfies the invoice execution criteria. To do so, processing node 119 may determine whether the agent's suggested revisions remedy each root cause error identified by auto-match node 117. If, at step 428, processing node 119 determines that the agent's suggested revisions do not satisfy the invoice execution criteria, then, at step 429*a*, processing node 119 may transmit a notification to consumer node 140. The notification may comprise a request for consumer node 140 to revise the errors within the invoice such that the invoice may proceed to execution (e.g., payment). The notification may further comprise the root cause errors identified by auto-match node 117. The notification may instruct consumer node 140 to review the root cause errors, to review the invoice submitted in step 401, and to revise the invoice such that the revisions remedy each root cause error. Upon receipt of the revisions from consumer node 140, processing node 119 may analyze the revised invoice using the execution criteria.

Figure 4K:
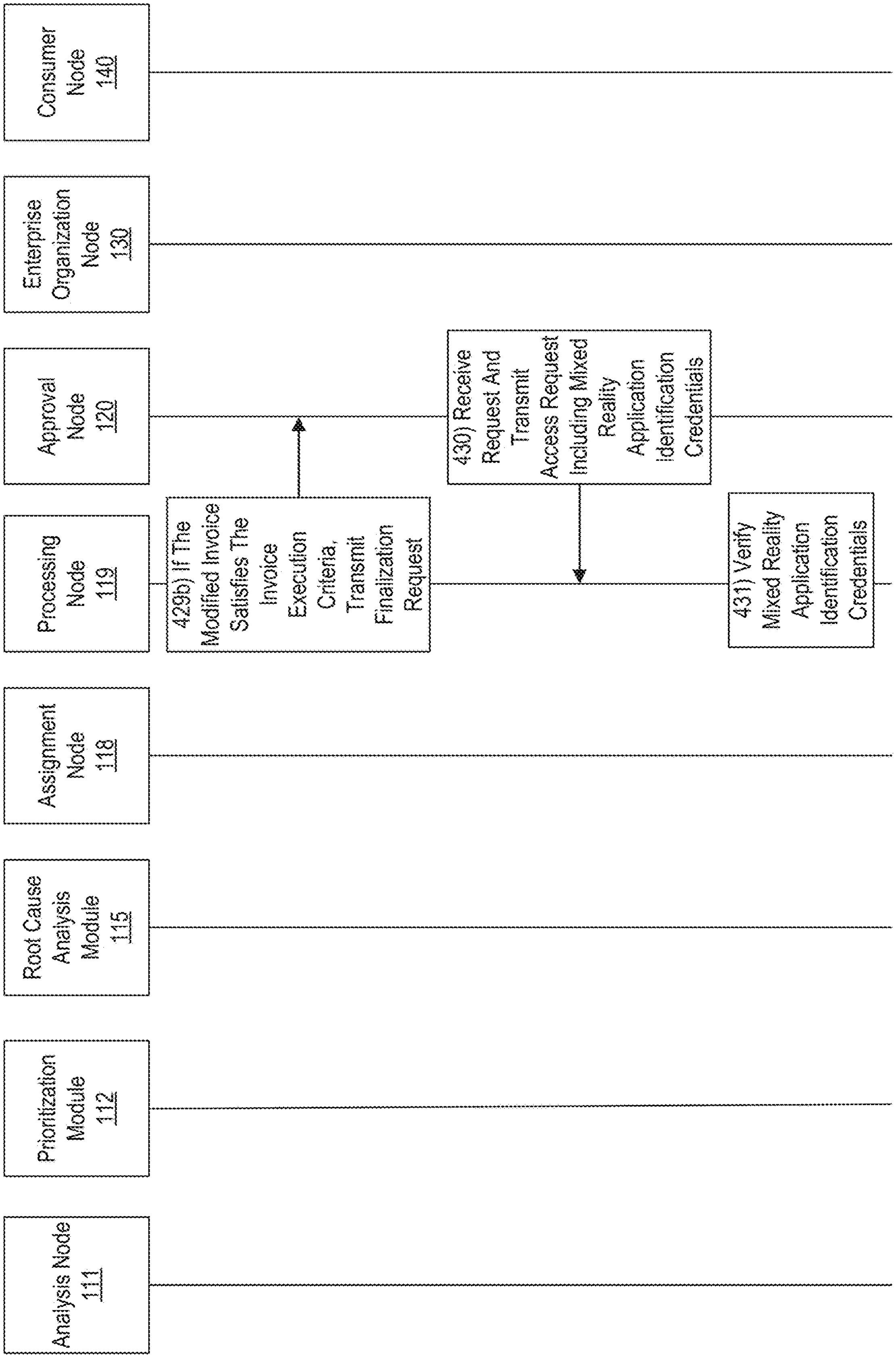
Figure 4L:
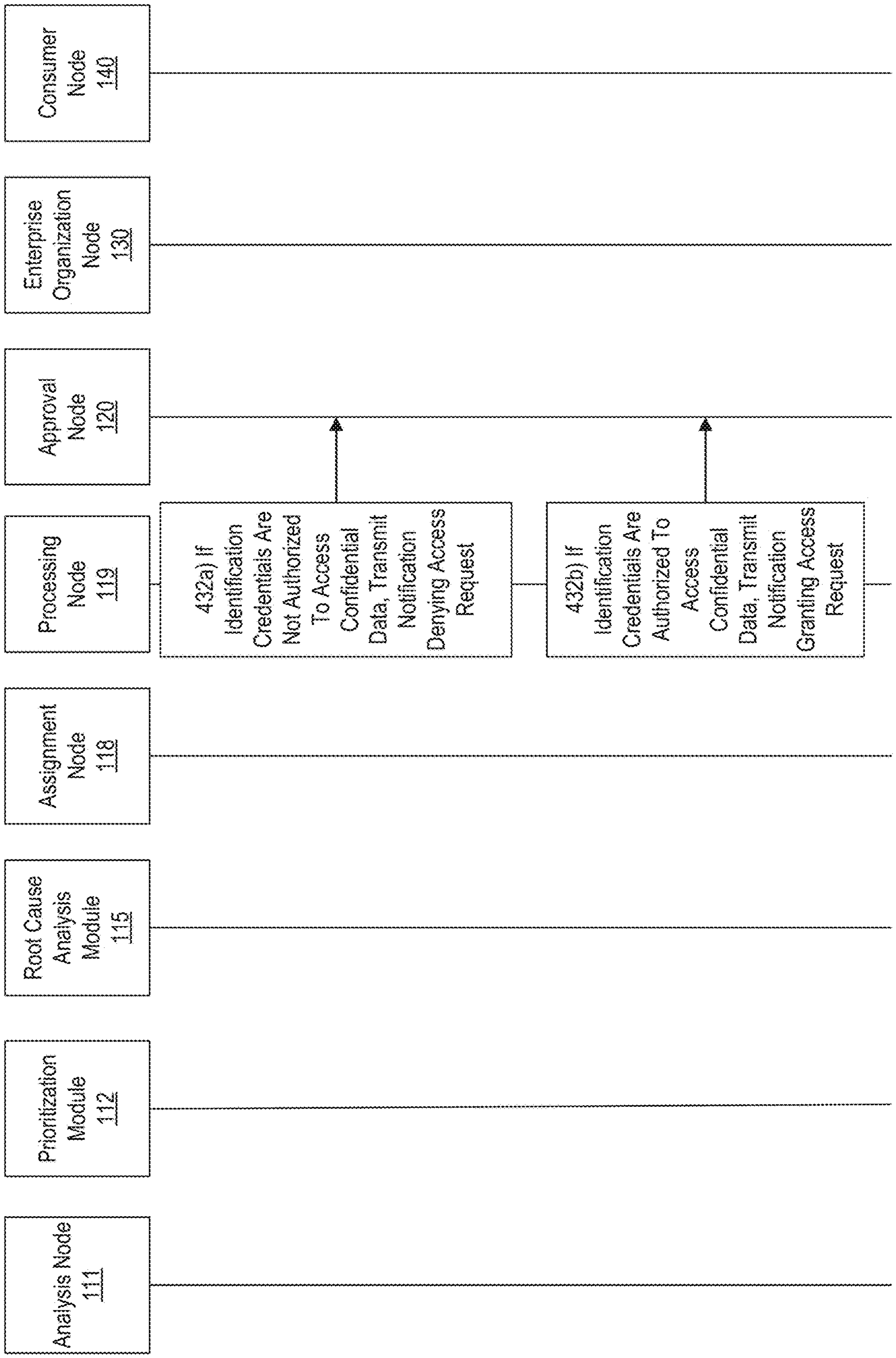

Alternatively, if, at step 428, processing node 119 determines that the agent's suggested revisions satisfy the invoice execution criteria, then, referring to FIG. 4K, at step 429*b*, processing node 119 may transmit an invoice finalization request to approval node 120. The finalization request may inform approval node 120 that it has been identified as an entity responsible for execution (e.g., payment) of the invoice and may invite approval node 120 to review the invoice revised by the agent. In particular, the finalization request may invite approval node 120 to request access to the confidential data received from the agent, wherein the confidential data comprises the agent's revisions to the invoice. The finalization request may further invite approval node 120 to submit identification credentials associated with a mixed reality application or mixed reality machine that approval node 120 may use to access and to review the confidential data.

At step 430, approval node 120 may receive the finalization request from processing node 119. Approval node 120 may transmit, to processing node 119, a request to access the confidential data. The access request may comprise identification credentials associated with the mixed reality application or mixed reality machine that approval node 120 may use to access and review the confidential data.

Approval node 120 may use a mixed reality application or a mixed reality machine to access and revise the confidential data. The mixed reality application and the mixed reality machine may allow approval node 120 to view the confidential data with an added overlay. The added overlay may highlight (e.g., point out, emphasize, or the like) data entry fields that the agent revised, the data in the highlighted data entry field, the agent's proposed revisions to the data in the highlighted data entry field, the agent's suggested alternative revisions to the data in the highlighted data entry field, or the like. The information that may be displayed using the overlay (e.g., the confidential data) might not be visible on the invoice itself. As such, the mixed reality applications and mixed reality machines may provide a secure environment within which approval node 120 may review and revise the confidential data. FIG. 8 depicts a sample overlay that may be visible to approval node 120 while using the mixed reality applications and/or mixed reality machines. As illustrated in FIG. 8, the overlay may identify each error within the data entry fields on the invoice, as indicated by the dashed ovals. Each identified error may be accompanied by a proposed revision and at least one alternative revision, as indicated in data entry fields that are separate from the data entry fields on the invoice.

For example, as illustrated in FIG. 8, the overlay indicates that the agent who processed the invoice identified at least five data entry fields that contain at least one error (e.g., "DESCRIPTION," "UNIT PRICE," "AMOUNT," "SUB-TOTAL," and "TOTAL"). The overlay indicates that the agent who processed the invoice generated a proposed revision to each identified error (e.g., adding a description of a transaction for a sale of goods, wherein the description reads "Agricultural Items Sold on MM/DD/YYYY"). The overlay further indicates that the agent generated at least one alternative revision to each identified error (e.g., a description of a transaction for services provided as opposed to the sale of goods). The overlay provides a method (e.g., a radio button, a checkbox, a data entry field for entering a new revision, or the like) for approval node 120 to select (e.g., implement) a proposed revision and for approval node 120 to draft a new revision if approval node 120 determines that the proposed revisions are insufficient.

Approval node 120 may revise the invoice (e.g., accept the agent's proposed revisions, reject the agent's proposed revisions, draft revisions, or the like) in real-time or near real-time using the mixed reality application or the mixed reality machine. In doing so, the revisions implemented by approval node 120 may be automatically transmitted to the backend processing (e.g., the revisions may be automatically implemented within confidential data database 125). Automatically implementing the revisions on the backend may allow approval node 120 to transmit revisions without communicating the revisions to other nodes within the P2P blockchain network. In particular, approval node 120 may revise the processed invoice within the confidential data without transmitting the revisions to processing node 119 and without requesting that processing node 119 implement the revisions. Automatically implementing the revisions on the backend may provide an added layer of security. Since the revisions are not transmitted between nodes within the P2P blockchain network, the likelihood of an unauthorized entity gaining unauthorized access to the revisions, and to the confidential data, may be reduced. The more the revisions are transmitted between nodes within the P2P blockchain network, the more the revisions may be susceptible to unauthorized access by an unauthorized entity. Therefore, allowing the revisions to remain within the mixed reality application or the mixed reality machine may increase the security surrounding the revisions and may reduce the likelihood of unauthorized access.

At step 431, processing node 119 may receive the access request from approval node 120. Processing node 119 may determine whether the identification credentials within the access request are authorized the access the confidential data using verification criteria. The verification criteria may comprise instructions for determining whether the identification credentials are authorized to access confidential data (e.g., the identification credentials are stored in database 126). To do so, processing node 119 may store, within database 126, the identification credentials that are authorized to access confidential data. Processing node 119 may review the stored identification credentials to determine whether the received identification credentials are authorized to access the confidential data. If, at step 431, processing node 119 determines that the received identification credentials are not authorized to access confidential data, then, referring to FIG. 4L, at step 432*a*, processing node 119 may transmit a notification to approval node 120. The notification may indicate that the request to access the confidential data is denied because the received identification credentials are not authorized to access the confidential data. Alternatively, if, at step 431, processing node 119 determines that the received identification credentials are authorized to access confidential data, then, at step 432*b* in FIG. 4L, processing node 119 may transmit a notification to approval node 120. The notification may indicate that the request to access the confidential data is granted because the received identification credentials are authorized to access the confidential data.

Figure 4M:
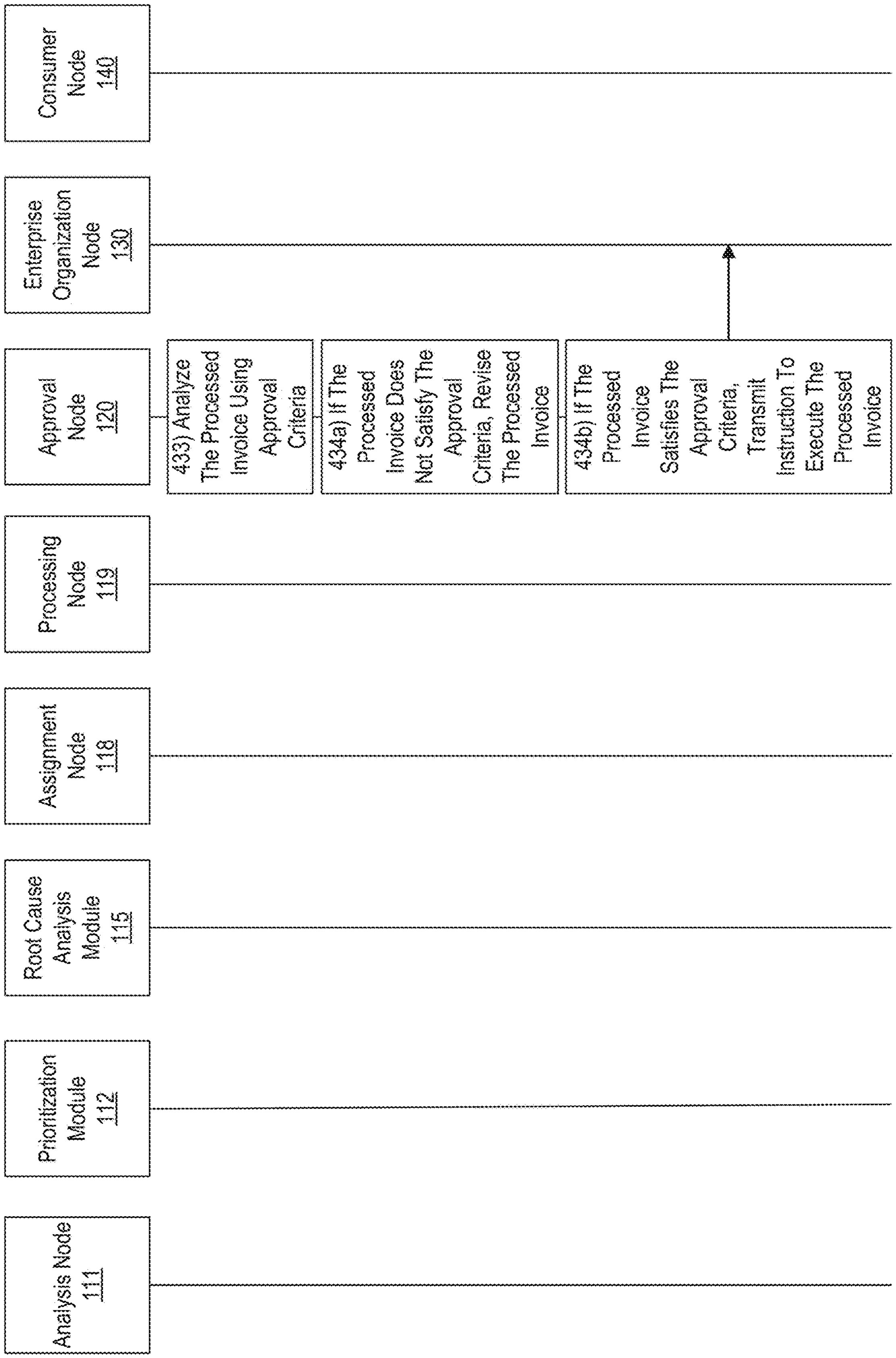

Referring to FIG. 4M, at step 433, approval node 120 may use the mixed reality application or mixed reality machine to access the confidential data. Approval node 120 may analyze the invoice processed by the agent using approval criteria. In particular, approval node 120 may compare the confidential data (e.g., the processed invoice, the root cause analysis, the proposed solutions generated by auto-match node 117, the list of proposed solutions that the agent received from assignment node 118, a log of the agent's revisions to the invoice, or the like) to approval criteria using either a mixed reality application or a mixed reality machine. The approval criteria may comprise instructions for determining whether the processed invoice may proceed to execution (e.g., whether the transaction balance indicated on the processed invoice is correct, whether the account information associated with the entities associated with the processed invoice is correct, whether the transaction indicated on the processed invoice is legitimate, whether the entities associated with the processed invoice are authorized to execute the transaction indicated on the processed invoice, or the like).

If, at step 433, approval node 120 determines that the processed invoice does not satisfy the approval criteria, then, at step 434*a*, approval node 120 may use the mixed reality application or the mixed reality machine to revise the processed invoice. To revise the processed invoice, approval node 120 may review the agent's revisions to the invoice and may reject the agent's revisions. In place of the agent's revisions, approval node 120 may implement at least one of the agent's alternative revisions. Alternatively, approval node 120 may draft the revisions to the processed invoice and may implement the revisions on the processed invoice. Approval node 120 may transmit a notification to processing node 119 indicating that approval node 120 drafted additional revisions to the processed invoice. The notification may instruct processing node 119 to implement the additional revisions to the processed invoice and to prepare the final invoice for execution (e.g., payment).

Alternatively, if, at step 433, approval node 120 determines that the processed invoice satisfies the approval criteria, then, at step 434*b*, approval node 120 may use the mixed reality application or the mixed reality machine to transmit instructions to enterprise organization node 130. The instructions may indicate that the invoice was properly processed by the agent and may instruct enterprise organization node 130 to execute the final invoice.

Figure 5A:
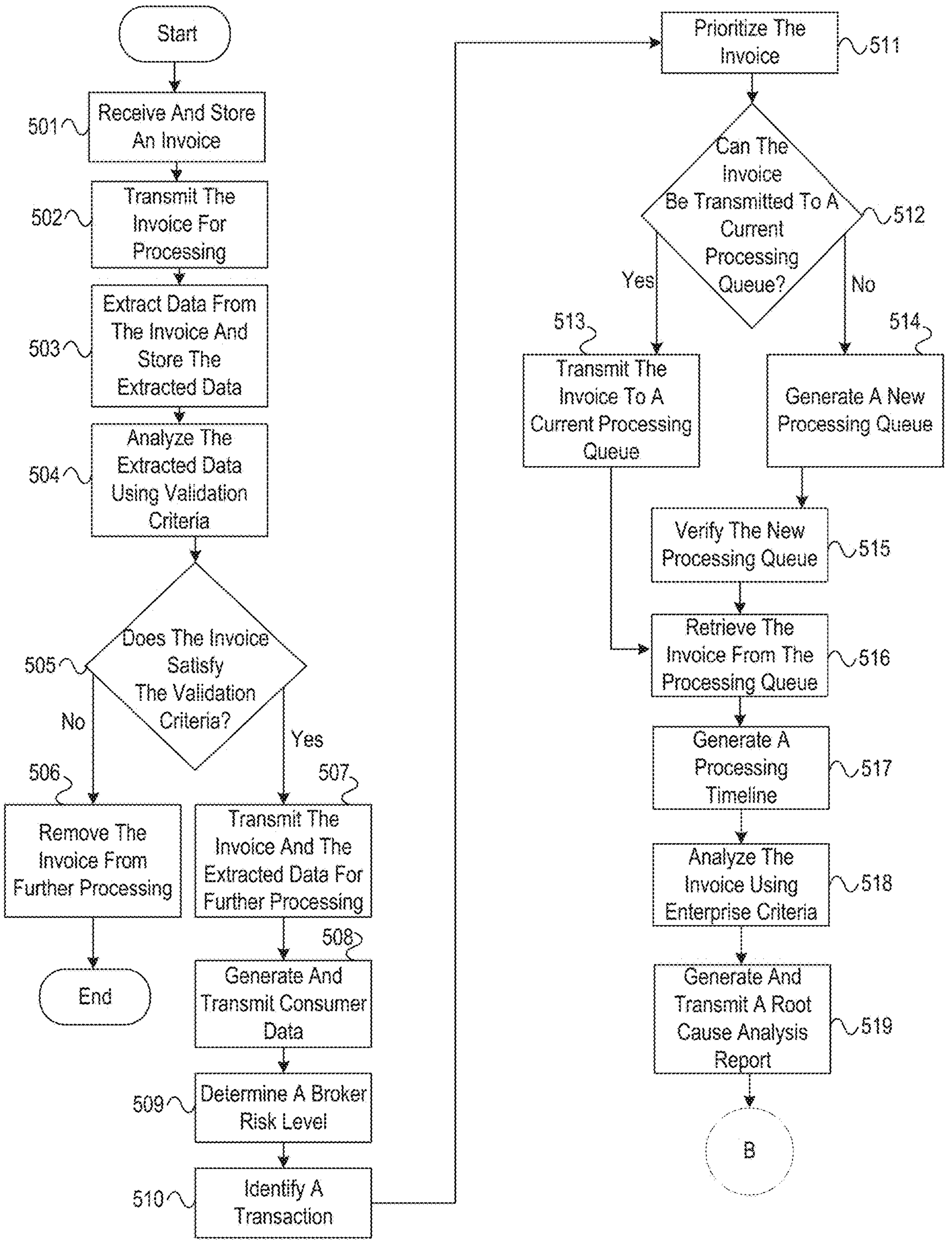
FIG. 5A-5B depict an illustrative method for intelligently managing invoice processing using blockchain and mixed reality applications, in accordance with one or more example embodiments.
Figure 5B:
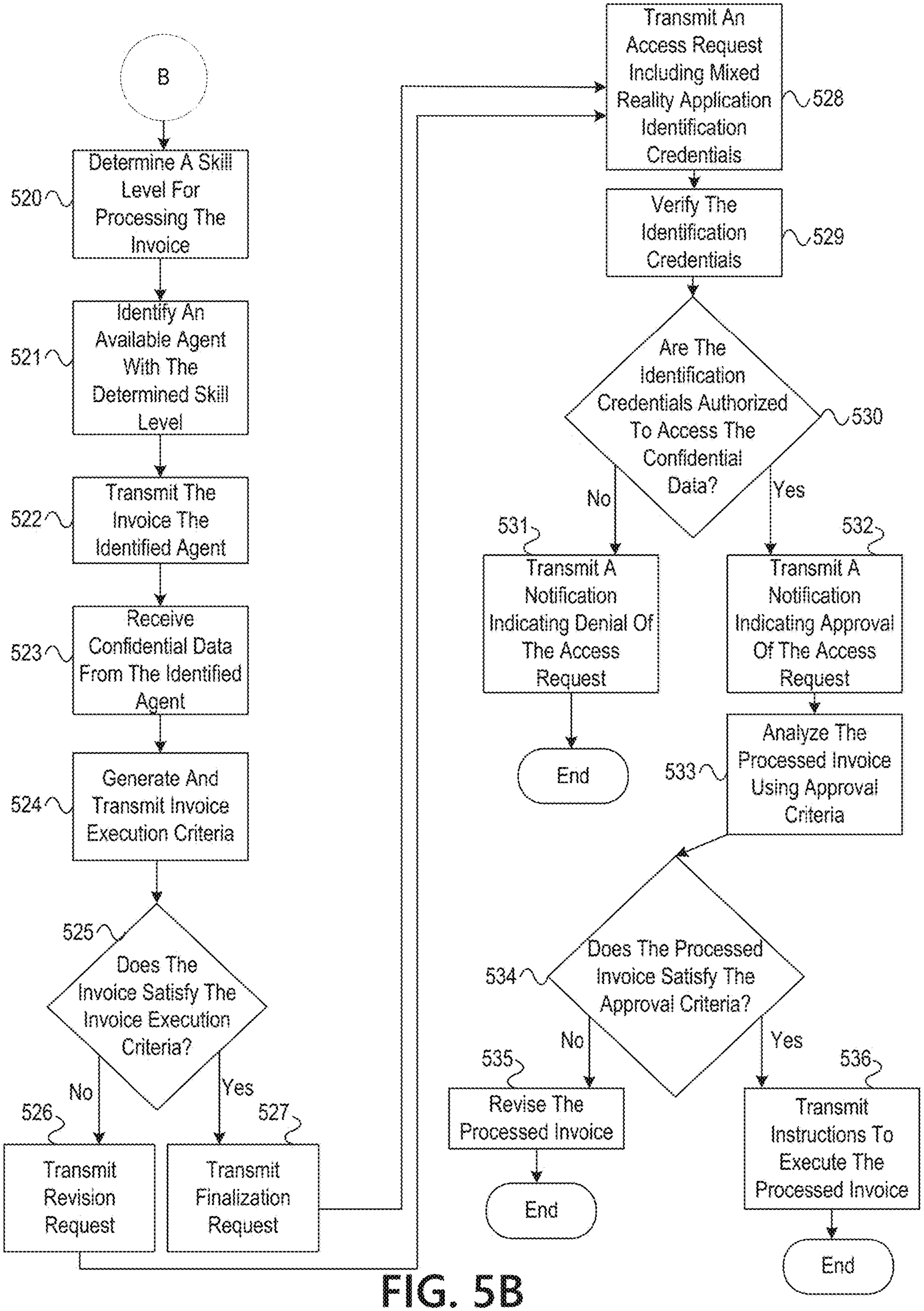

FIGS. 5A-5B depicts a flow diagram illustrating one example method for intelligently managing invoice processing in real-time, or near real-time, using blockchain and mixed reality applications in accordance with one or more aspects described herein. The processes illustrated in FIGS. 5A-5B are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 5 may be performed in real-time or near real-time.

Referring to FIG. 5A, at step 501, enterprise organization node 130 may receive an invoice from consumer node 140. Enterprise organization node 140 may store the invoice in invoice data database 121. At step 502, may transmit the invoice, across network 150, to analysis node 111 for further processing.

At step 503, analysis node 111 may receive the invoice from enterprise organization node 130. Analysis node 111 may analyze the invoice and may extract data from the invoice (e.g., a number of data entry fields that are populated, a number of data entry fields that are not populated, whether the received invoice is blank, or the like).

At step 504, analysis node 111 may analyze the extracted data to determine whether the invoice should undergo further processing. To analyze the extracted data, analysis node 111 may use validation criteria generated by enterprise organization node 130. The validation criteria may set forth requirements that analysis node 111 may use to determine whether the invoice should be processed further (e.g., whether the invoice contains data entry fields, whether the invoice contains data entry fields that require a response, whether the required data entry fields are populated, whether the responses within the populated data entry fields conform to an expected format, whether the invoice matches a previously received invoice stored in historic invoices database 122, or the like).

At step 505, analysis node 111 may determine whether the invoice satisfies the validation criteria. If, at step 505, analysis node 111 determines that the invoice fails to satisfy the validation criteria, then, at step 506, analysis node 111 may remove the invoice from further processing. Alternatively, if, at step 505, analysis node 111 determines that the invoice satisfies the validation criteria, then, at step 507, analysis node 111 may transmit the invoice and the extracted data to prioritization module 112.

At step 508, enterprise organization node 130 may generate consumer data that describes consumer node 140 (e.g., the broker that generated the invoice). The consumer data may describe the broker's location, a number of invoices previously submitted by the broker, a number of approved invoices associated with the broker, a number of rejected invoices associated with the broker, monetary values associated with the invoices that were previously submitted by the broker, or the like. Enterprise organization node 130 may transmit the consumer data to prioritization module 112.

At step 509, sorting node 113 of prioritization module 112 may receive the consumer data and may use the consumer data to determine a risk level associated with consumer node 140 (e.g., the broker). To determine a risk level associated with consumer node 140, sorting node 113 may generate a hierarchy of factors using the consumer data (e.g., the number of rejected broker invoices may be assigned a greater weight than the broker's location). Sorting node 113 may assign a weight to each factor within the hierarchy of factors. Sorting node 113 may use the weighted factors to determine a weighted average associated with consumer node 140, wherein the weighted average may be the risk level associated with consumer node 140. Sorting node 113 may store the risk level associated with consumer node 140 within invoice data database 121.

At step 510, sorting node 113 may identify a transaction on the invoice generated by consumer node 140. To do so, sorting node 113 may retrieve the invoice from invoice data database 121. Sorting node 113 may analyze each data entry field on the invoice to identify the data entry field that describes a product that was sold by a first entity and purchased by a second entity, a service that was provided by a first entity and to a second entity, or the like. Sorting node 113 may parse the language within the identified data entry field to determine the nature of the transaction indicated on the invoice.

At step 511, sorting node 113 may prioritize the invoice based on the determined risk level associated with consumer node 140 and based on the transaction indicated on the invoice. To prioritize the invoice, sorting node 113 may transmit the invoice to a processing queue of a plurality of current processing queues. Each processing queue may correspond to a risk level associated consumer node 140 or may correspond to a transaction indicated on the invoice. In some instances, to determine the processing queue to which the invoice should be transmitted, sorting node 113 may determine whether the risk level associated with the broker associated with the invoice corresponds to the risk level of the brokers associated with the invoices within a current processing queue. In some instances, to determine the processing queue to which the invoice should be transmitted, sorting node 113 may determine whether the transaction indicated on the invoice corresponds to the transactions indicated on the invoices within current processing queues.

At step 512, sorting node 113 may determine, based on the information from step 511, whether the invoice can be transmitted to a processing within the plurality of current processing queues. If, at step 512, sorting node 113 determines that the invoice can be transmitted to a processing queue of the plurality of current processing queues, then, at step 513, sorting node 113 may transmit the invoice to the processing queue of the plurality of current processing queues that corresponds to the invoice. Alternatively, if, at step 512, sorting node 113 determines that the invoice does not correspond to a processing queue of the plurality of current processing queues, then, at step 514, sorting node 113 may generate a new processing queue and may transmit the invoice to the new processing queue.

If, at step 514, sorting node 113 generates a new processing queue, then, at step 515, sorting node 113 may instruct verification node 114 to verify the new processing queue. To verify the new processing queue, verification node 114 may retrieve the invoice within the new processing queue. Verification node 114 may identify the transaction associated with the invoice and the risk level associated with the broker associated with the invoice. Verification node 114 may determine whether the type of transaction indicated on the invoice corresponds to the transactions associated with current processing queues. Additionally, verification node 114 may determine whether the risk level of the broker that is associated with the invoice corresponds to the risk level associated with the brokers that are associated with the invoices in current processing queues. If verification node 114 determines that the invoice within the new processing queue is substantially similar to the invoices within a current processing queue, then verification node 114 may instruct sorting node 113 to remove the invoice from the new processing queue and to transmit the invoice to a current processing queue. Alternatively, if verification node 114 determines that the invoice within the new processing queue is not substantially similar to the invoices within a current processing queue, then verification node 114 may add the new processing queue to the plurality of current processing queues.

At step 516, root cause analysis module 115 may retrieve the invoice from the processing queue to which it was transmitted in either one of steps 513 or 514. At step 517, prediction node 116 of root cause analysis module 115 may access the data associated with the invoice that is stored within invoice data database 121 (e.g., the data extracted from the invoice, the risk level associated with the broker that is associated with the invoice, or the like). Prediction node 116 may use the data within invoice data database 121 to predict an amount of time that may be needed to process the invoice (e.g., whether the invoice may be processed without revisions from the broker, whether further information may be needed from the broker, whether the data entry fields within the invoice are fully populated, or the like). Prediction node 116 may transmit the prediction to enterprise organization node 130.

At step 518, auto-match node 117 of root cause analysis module 115 may analyze the invoice using enterprise criteria. Auto-match node 117 may continuously receive enterprise criteria from enterprise organization node 130. The enterprise criteria may contain instructions for determining whether the invoice satisfies requirements set forth by the enterprise organization (e.g., whether the transaction indicated on the invoice is recorded within a transaction history associated with an entity that is associated with the invoice, whether the transaction indicated on the invoice is indicated within an entity account history, whether a balance indicated on the invoice matches an amount within an entity account, or the like). Auto-match node 117 may determine whether the invoice satisfies each factor within the enterprise criteria. If the invoice does not satisfy a factor within the enterprise criteria, then auto-match node 117 may maintain a list of the factors that the invoice failed to satisfy (e.g., a list of root cause errors). For each root cause error, auto-match node 117 may generate a list of proposed solutions to remedy the root cause error. To generate the list of proposed solutions to the root cause errors, auto-match node 117 may determine whether similar root cause errors were previously identified, the proposed solution(s) for each previously identified root cause error that is similar to the present root cause error, and whether the proposed solution(s) were successful.

At step 519, auto-match node 117 may generate a root cause analysis report. To generate the root cause analysis report, auto-match node 117 may compile the list of root cause errors and the list the proposed solution(s) that accompanies each identified root cause error. The root cause analysis report may also indicate the invoice as well as the enterprise criteria that auto-match node 117 used to analyze the invoice. Auto-match node 117 may store the root cause analysis report in root cause database 123 and may transmit a copy of the root cause analysis report to assignment node 118.

Referring to FIG. 5B, at step 520, assignment node 118 may determine a skill level associated with processing the invoice (e.g., whether the invoice can be processed by a junior agent within the enterprise organization, whether the invoice should be processed by a senior agent within the enterprise organization, whether a specific agent within the enterprise organization handles the invoices associated with a particular entity, or the like). To determine the skill level associated with processing the invoice, assignment node 118 may review the root cause analysis report. Assignment node 118 may use the list of root causes errors and the list of proposed solutions to estimate the skill level. Assignment node 118 may store the determined skill level in availability and skills database 124.

At step 521, assignment node 118 may identify an agent within the enterprise organization who has the determined skill level to handle the invoice and who is available to handle the invoice. Assignment node 118 may retrieve, from availability and skills database 124, data indicating the availability of agents within the enterprise organization and the skill level of agents within the enterprise organization. Assignment node 118 may compare the determined skill level to the skill level of agents within the enterprise organization. Assignment node 118 may identify at least one agent within the enterprise organization whose skill level may be sufficient to process the invoice. Assignment node 118 may consider the availability of the identified agents to determine whether at least one agent is available to process the invoice. At step 522, assignment node 118 may transmit the invoice to the identified agent within the enterprise organization with the skill level and availability to process the invoice.

At step 523, processing node 119 may receive confidential data from the agent identified in step 521. The confidential data may comprise a root cause analysis associated with the invoice processed by the agent, wherein the root cause analysis may comprise suggested solutions, determined by the agent, to remedy the identified root cause errors within the invoice. The confidential data may also comprise a description of the agent's revisions to the processed invoice (e.g., the data entry field that the agent revised, the data in the data entry field prior to the agent's revisions, the agent's revision to the data entry field, the data in the data entry field after the agent's revisions, the agent's suggested alternative revisions to the data entry field, or the like).

Processing node 119 may store the confidential data within confidential data database 125.

At step 524, enterprise organization node 130 may generate invoice execution criteria. The invoice execution criteria may comprise instructions for determining whether the invoice may proceed to execution (e.g., payment). The invoice execution criteria may consider whether the processed invoice contains the correct balance, whether each data entry field is populated, whether the correct entity is indicated as responsible for execution of the invoice, whether the account history for each entity correctly indicates the transaction indicated on the invoice, or the like. Enterprise organization node 130 may transmit the invoice execution criteria to processing node 119.

At step 525, processing node 119 may determine whether the invoice processed by the agent satisfies the invoice execution criteria. To do so, processing node 119 may determine whether the agent's suggested revisions remedy each root cause error identified by auto-match node 117. If, at step 525, processing node 119 determines that the agent's suggested revisions do not satisfy the invoice execution criteria, then, at step 526, processing node 119 may transmit a notification to consumer node 140. The notification may comprise a request for consumer node 140 to revise the errors within the invoice such that the invoice may proceed to execution (e.g., payment). The notification may further comprise the root cause errors identified by auto-match node 117. The notification may instruct consumer node 140 to review the root cause errors, to review the invoice received by enterprise organization node 130 in step 501, and to revise the invoice such that the revisions remedy each root cause error. Upon receipt of the revisions from consumer node 140, processing node 119 may analyze the revised invoice using the execution criteria.

Alternatively, if, at step 525, processing node 119 determines that the agent's suggested revisions satisfy the invoice execution criteria, then, at step 527, processing node 119 may transmit an invoice finalization request to approval node 120. The finalization request may inform approval node 120 that it has been identified as an entity responsible for execution (e.g., payment) of the invoice and may invite approval node 120 to review the invoice revised by the agent. In particular, the finalization request may invite approval node 120 to request access to the confidential data received from the agent, wherein the confidential data comprises the agent's revisions to the invoice. The finalization request may further invite approval node 120 to submit identification credentials associated with a mixed reality application or mixed reality machine that approval node 120 may use to access and to review the confidential data.

At step 528, approval node 120 may transmit, to processing node 119, a request to access the confidential data. The access request may comprise identification credentials associated with the mixed reality application or mixed reality machine that approval node 120 may use to access and review the confidential data. The mixed reality application and the mixed reality machine may provide a secure environment within which approval node 120 may access the confidential data. The mixed reality application and the mixed reality machine may provide an added layer of protection to prevent unauthorized entities from accessing the confidential data.

At step 529, processing node 119 may receive the access request from approval node 120. Processing node 119 may determine whether the identification credentials within the access request are authorized the access the confidential data. To do so, processing node 119 may store, within database 126, the identification credentials that are authorized to access confidential data. Processing node 119 may review the stored identification credentials to determine whether the received identification credentials are authorized to access the confidential data.

If, at step 530, processing node 119 determines that the received identification credentials are not authorized to access confidential data, then, at step 531, processing node 119 may transmit a notification to approval node 120. The notification may indicate that the request to access the confidential data is denied because the received identification credentials are not authorized to access the confidential data. Alternatively, if, at step 530, processing node 119 determines that the received identification credentials are authorized to access confidential data, then, at step 532, processing node 119 may transmit a notification to approval node 120. The notification may indicate that the request to access the confidential data is granted because the received identification credentials are authorized to access the confidential data.

At step 533, approval node 120 may use the mixed reality application or mixed reality machine to access the confidential data. Approval node 120 may analyze the invoice processed by the agent using approval criteria. In particular, approval node 120 may compare the confidential data (e.g., the processed invoice, the root cause analysis, the proposed solutions generated by auto-match node 117, the list of proposed solutions that the agent received from assignment node 118, a log of the agent's revisions to the invoice, or the like) to approval criteria using either a mixed reality application or a mixed reality machine.

The mixed reality application and the mixed reality machine may allow approval node 120 to view the confidential data with an added overlay. The added overlay may highlight (e.g., point out, emphasize, or the like) data entry fields that the agent revised, the data in the highlighted data entry field, the agent's proposed revisions to the data in the highlighted data entry field, the agent's suggested alternative revisions to the data in the highlighted data entry field, or the like. The information that may be displayed using the overlay (e.g., the confidential data) might not be visible on the invoice itself. As such, the mixed reality applications and mixed reality machines may provide a secure environment within which approval node 120 may review and revise the confidential data. FIG. 8 depicts a sample overlay that may be visible to approval node 120 while using the mixed reality applications and/or mixed reality machines. As illustrated in FIG. 8, the overlay may identify each error within the data entry fields on the invoice, as indicated by the dashed ovals. Each identified error may be accompanied by a proposed revision and at least one alternative revision, as indicated in data entry fields that are separate from the data entry fields on the invoice.

The approval criteria may comprise instructions for determining whether the processed invoice may proceed to execution (e.g., whether the transaction balance indicated on the processed invoice is correct, whether the account information associated with the entities associated with the processed invoice is correct, whether the transaction indicated on the processed invoice is legitimate, whether the entities associated with the processed invoice are authorized to execute the transaction indicated on the processed invoice, or the like).

If, at step 534, approval node 120 determines that the processed invoice does not satisfy the approval criteria, then, at step 535, approval node 120 may revise the invoice (e.g., accept the agent's proposed revisions, reject the agent's proposed revisions, draft revisions, or the like) in real-time or near real-time using the mixed reality application or the mixed reality machine. In doing so, the revisions implemented by approval node 120 may be automatically transmitted to the backend processing (e.g., the revisions may be automatically implemented within confidential data database 125). Automatically implementing the revisions on the backend may allow approval node 120 to transmit revisions without communicating the revisions to other nodes within the P2P blockchain network. In particular, approval node 120 may revise the processed invoice within the confidential data without transmitting the revisions to processing node 119 and without requesting that processing node 119 implement the revisions. Automatically implementing the revisions on the backend may provide an added layer of security. Since the revisions are not transmitted between nodes within the P2P blockchain network, the likelihood of an unauthorized entity gaining unauthorized access to the revisions, and to the confidential data, may be reduced. The more the revisions are transmitted between nodes within the P2P blockchain network, the more the revisions may be susceptible to unauthorized access by an unauthorized entity. Therefore, allowing the revisions to remain within the mixed reality application or the mixed reality machine may increase the security surrounding the revisions and may reduce the likelihood of unauthorized access. Approval node 120 may transmit a notification to processing node 119 indicating that approval node 120 drafted additional revisions to the processed invoice.

Alternatively, if, at step 534, approval node 120 determines that the processed invoice satisfies the approval criteria, then, at step 536, approval node 120 may use the mixed reality application or the mixed reality machine to transmit instructions to enterprise organization node 130. The instructions may indicate that the invoice was properly processed by the agent and may instruct enterprise organization node 130 to execute the final invoice.

As a result, the proposed solution may provide the following benefits: 1) dynamic prioritization of the invoices received by the enterprise organization; 2) real-time, or near real-time, validation of the received invoices using a blockchain network; and 3) use of mixed reality applications to maintain the confidentiality of invoices containing sensitive information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

at a computing device configured to operate in a peer-to-peer (P2P) network including at least one or more processors and memory storing at least a portion of a blockchain of the P2P network:

analyzing, using validation criteria, a plurality of invoices to determine a validity of each invoice of the plurality of invoices;

determining, based on a broker associated with a first invoice of the plurality of invoices, a risk level associated with the broker;

transmitting, based on the risk level associated with the broker, the first invoice to a processing queue of a plurality of processing queues;

identifying errors within the first invoice and proposed solutions to fix the errors;

transmitting, to an enterprise organization, the first invoice, the errors, and the proposed solutions;

receiving, from the enterprise organization, confidential data, wherein the confidential data comprises a modified invoice that was modified using at least one of the proposed solutions;

receiving, from an entity associated with a transaction indicated on the first invoice, a request to access the modified invoice, wherein the request comprises identification credentials associated with a mixed reality application that is used to access the modified invoice;

displaying, using the mixed reality application, the modified invoice, wherein displaying the modified invoice includes displaying the modified invoice, via the mixed reality application, with an overlay highlighting modifications to the modified invoice and wherein the overlay displays data not visible on the first invoice;

determining, using the mixed reality application, whether the modified invoice satisfies approval criteria; and based on the modified invoice satisfying the approval criteria, transmitting, to the enterprise organization, a notification authorizing execution of the modified invoice.

2. The method of claim 1, wherein the validation criteria comprises determining whether:

the invoice is blank;

a data entry field within the invoice contains correctly formatted data; or the invoice is a duplicate invoice.

3. The method of claim 1, wherein the determining the risk level associated with the broker comprises determining a weighted average of at least one of:

a location associated with the broker;

a total number of invoices previously submitted from the broker and to the enterprise organization;

a number of previously denied invoices associated with the broker;

a number of previously approved invoices associated with the broker; or monetary values of the invoices previously submitted from the broker and to the enterprise organization.

4. The method of claim 1, wherein the transmitting the first invoice to the processing queue is further based on the transaction indicated on the first invoice matching transactions associated with other invoices in the processing queue.

5. The method of claim 1, further comprising comparing, using an auto-matching algorithm, data within the first invoice to enterprise criteria to identify the errors within the first invoice, wherein the enterprise criteria comprises guidelines for determining whether the data within the first invoice corresponds to enterprise organization data that describes the transaction indicated on the first invoice.

6. The method of claim 1, further comprising:

determining, using verification criteria, whether the identification credentials are authorized to access the modified invoice; and transmitting, to the enterprise organization, a notification indicating one of:

a failed verification of the mixed reality application associated with the identification credentials, based on the identification credentials failing to satisfy the verification criteria; or a successful verification of the mixed reality application associated with the identification credentials, based on the identification credentials satisfying the verification criteria.

7. The method of claim 1, further comprising:

determining that the modified invoice failed to satisfy the approval criteria;

revising, by the entity associated with the transaction indicated on the first invoice, the modified invoice; and transmitting, to the enterprise organization, a notification authorizing execution of the modified invoice revised by the entity.

8. A computing platform comprising:

at least one processor;

a communication interface communicatively couples to the at least one processor; and memory storing at least a portion of a blockchain in a peer-to-peer (P2P) network and computer-readable instructions that, when executed by the at least one processor, cause the computing platform to:

analyze, using validation criteria, a plurality of invoices to determine a validity of each invoice of the plurality of invoices;

determine, based on a broker associated with a first invoice of the plurality of invoices, a risk level associated with the broker;

transmit, based on the risk level associated with the broker, the first invoice to a processing queue of a plurality of processing queues;

identify errors within the first invoice and proposed solutions to fix the errors;

transmit, to an enterprise organization, the first invoice, the errors, and the proposed solutions;

receive, from the enterprise organization, confidential data, wherein the confidential data comprises a modified invoice that was modified using at least one of the proposed solutions;

receive, from an entity associated with a transaction indicated on the first invoice, a request to access the modified invoice, wherein the request comprises identification credentials associated with a mixed reality application that is used to access the modified invoice;

display, using the mixed reality application, the modified invoice, wherein displaying the modified invoice includes displaying the modified invoice, via the mixed reality application, with an overlay highlighting modifications to the modified invoice and wherein the overlay displays data not visible on the first invoice;

determine, using the mixed reality application, whether the modified invoice satisfies approval criteria; and based on the modified invoice satisfying the approval criteria, transmit, to the enterprise organization, a notification authorizing execution of the modified invoice.

9. The computing platform of claim 8, wherein the determining the risk level associated with the broker comprises determining a weighted average of at least one of:

a location associated with the broker;

a total number of invoices previously submitted from the broker and to the enterprise organization;

a number of previously denied invoices associated with the broker;

a number of previously approved invoices associated with the broker; or monetary values of the invoices previously submitted from the broker and to the enterprise organization.

10. The computing platform of claim 8, wherein the transmitting the first invoice to the processing queue is further based on the transaction indicated on the first invoice matching transactions associated with other invoices in the processing queue.

11. The computing platform of claim 8, wherein the instructions, when executed, further cause the computing platform to compare, using an auto-matching algorithm, data within the first invoice to enterprise criteria to identify the errors within the first invoice, wherein the enterprise criteria comprises guidelines for determining whether the data within the first invoice corresponds to enterprise organization data that describes the transaction indicated on the first invoice.

12. The computing platform of claim 8, wherein the instructions, when executed, further cause the computing platform to:

determine, using verification criteria, whether the identification credentials are authorized to access the modified invoice; and transmit, to the enterprise organization, a notification indicating one of:

a failed verification of the mixed reality application associated with the identification credentials, based on the identification credentials failing to satisfy the verification criteria; or a successful verification of the mixed reality application associated with the identification credentials, based on the identification credentials satisfying the verification criteria.

13. The computing platform of claim 8, wherein the instructions, when executed, further cause the computing platform to:

determine that the modified invoice failed to satisfy the approval criteria;

revise, by the entity associated with the transaction indicated on the first invoice, the modified invoice; and transmit, to the enterprise organization, a notification authorizing execution of the modified invoice revised by the entity.

14. One or more non-transitory computer-readable media storing instructions that, when executed by a computing platform comprising at least one processor, memory storing at least a portion of a blockchain in a peer-to-peer (P2P) network, and a communication interface, cause the computing platform to:

analyze, using validation criteria, a plurality of invoices to determine a validity of each invoice of the plurality of invoices;

determine, based on a broker associated with a first invoice of the plurality of invoices, a risk level associated with the broker;

transmit, based on the risk level associated with the broker, the first invoice to a processing queue of a plurality of processing queues;

identify errors within the first invoice and proposed solutions to fix the errors;

transmit, to an enterprise organization, the first invoice, the errors, and the proposed solutions;

receive, from the enterprise organization, confidential data, wherein the confidential data comprises a modified invoice that was modified using at least one of the proposed solutions;

receive, from an entity associated with a transaction indicated on the first invoice, a request to access the modified invoice, wherein the request comprises identification credentials associated with a mixed reality application that is used to access the modified invoice;

display, using the mixed reality application, the modified invoice, wherein displaying the modified invoice includes displaying the modified invoice, via the mixed reality application, with an overlay highlighting modifications to the modified invoice and wherein the overlay displays data not visible on the first invoice;

determine, using the mixed reality application, whether the modified invoice satisfies approval criteria; and based on the modified invoice satisfying the approval criteria, transmit, to the enterprise organization, a notification authorizing execution of the modified invoice.

15. The one or more non-transitory computer-readable media of claim 14, wherein the validation criteria comprises determining whether:

the invoice is blank;

a data entry field within the invoice contains correctly formatted data; or the invoice is a duplicate invoice.

16. The one or more non-transitory computer-readable media of claim 14, wherein the determining the risk level associated with the broker comprises determining a weighted average of at least one of:

a location associated with the broker;

a total number of invoices previously submitted from the broker and to the enterprise organization;

a number of previously denied invoices associated with the broker;

a number of previously approved invoices associated with the broker; or monetary values of the invoices previously submitted from the broker and to the enterprise organization.

17. The one or more non-transitory computer-readable media of claim 14, wherein the transmitting the first invoice to the processing queue is further based on the transaction indicated on the first invoice matching transactions associated with other invoices in the processing queue.

18. The one or more non-transitory computer-readable media of claim 14, wherein the instructions, when executed, further cause the computing platform to compare, using an auto-matching algorithm, data within the first invoice to enterprise criteria to identify the errors within the first invoice, wherein the enterprise criteria comprises guidelines for determining whether the data within the first invoice corresponds to enterprise organization data that describes the transaction indicated on the first invoice.

19. The one or more non-transitory computer-readable media of claim 14, wherein the instructions, when executed, further cause the computing platform to:

determine, using verification criteria, whether the identification credentials are authorized to access the modified invoice; and transmit, to the enterprise organization, a notification indicating one of:

a failed verification of the mixed reality application associated with the identification credentials, based on the identification credentials failing to satisfy the verification criteria; or a successful verification of the mixed reality application associated with the identification credentials, based on the identification credentials satisfying the verification criteria.

20. The one or more non-transitory computer-readable media of claim 14, wherein the instructions, when executed, further cause the computing platform to:

determine that the modified invoice failed to satisfy the approval criteria;

revise, by the entity associated with the transaction indicated on the first invoice, the modified invoice; and transmit, to the enterprise organization, a notification authorizing execution of the modified invoice revised by the entity.

* * * * *